US012579694B2

(12) United States Patent　　(10) Patent No.:　US 12,579,694 B2
Oh et al.　　(45) Date of Patent:　Mar. 17, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD THAT INCLUDE SCALABILITY ENABLE FLAG INFORMATION

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/028,635

(22) PCT Filed: Oct. 6, 2021

(86) PCT No.: PCT/KR2021/013722
　§ 371 (c)(1),
　(2) Date: Mar. 27, 2023

(87) PCT Pub. No.: WO2022/075753
　PCT Pub. Date: Apr. 14, 2022

(65) Prior Publication Data
　US 2023/0334703 A1　Oct. 19, 2023

Related U.S. Application Data

(60) Provisional application No. 63/088,998, filed on Oct. 7, 2020.

(30) Foreign Application Priority Data

Oct. 6, 2020　(KR) ........................ 10-2020-0128676

(51) Int. Cl.
　*G06T 9/00*　(2006.01)
　*G06T 9/40*　(2006.01)
　　(Continued)

(52) U.S. Cl.
　CPC ............ *G06T 9/00* (2013.01); *G06T 2210/36* (2013.01); *G06T 2210/56* (2013.01)

(58) Field of Classification Search
　None
　See application file for complete search history.

(56) References Cited

U.S. PATENT DOCUMENTS

2005/0203930 A1* 9/2005 Bukowski ............... G06F 16/29
2019/0080483 A1* 3/2019 Mammou ................. G06T 7/50
　　　　(Continued)

FOREIGN PATENT DOCUMENTS

KR　10-2019-0089115 A　7/2019
KR　10-2020-0039757 A　4/2020
WO　　2020072665 A1　4/2020

OTHER PUBLICATIONS

"G-PCC codec description v8", International Organisation for Standardisation Organisation Internationale de Normalisation ISO/IEC JTC1/SC29/WG11 Coding of Moving Pictures and Audio ISO/IEC JTC1/SC29/WG11 N19525. Jul. 2020, Online.
　　　　(Continued)

*Primary Examiner* — Edemio Navas, Jr.
(74) *Attorney, Agent, or Firm* — Bryan Cave Leighton Paisner LLP

(57)　　　ABSTRACT

A point cloud data transmission method according to embodiments may comprise the steps of: encoding point cloud data; and transmitting a bitstream including the point cloud data. In addition, a point cloud data reception method
　　　　(Continued)

according to embodiments may comprise the steps of: receiving a bitstream including point cloud data; and decoding the point cloud data.

19 Claims, 39 Drawing Sheets

(51) Int. Cl.
H04N 19/00 (2014.01)
H04N 19/597 (2014.01)

(56) References Cited

U.S. PATENT DOCUMENTS

| | | | | |
|---|---|---|---|---|
| 2021/0407148 A1* | 12/2021 | Flynn | ............... | H04N 19/1883 |
| 2022/0207782 A1* | 6/2022 | Iguchi | ............... | G06T 17/00 |
| 2023/0177735 A1* | 6/2023 | Kuma | ............... | H04N 19/70 |
| | | | | 382/232 |
| 2023/0237704 A1* | 7/2023 | Yuan | ............... | H04N 19/117 |
| | | | | 382/232 |

OTHER PUBLICATIONS

Zhenzhen Gao, et al., I"G-PCC: A method to compute dist2 values for LoD attribute coding", International Organisation for Standardisation Organisation Internationale de Normalisation ISO/IEC JTC1/SC29/WG11 Coding of Moving Pictures and Audio. ISO/IEC JCTC1/SC29/WG11 MPEG/m52524. Jan. 2020, Brussels, Belgium.
3DG, "G-PCC codec description v7", XP030289576, ISO/IEC JTC1/SC29/WG11 N19331, Apr. 2020, Online.
Hyun-Mook Oh, LG Electronics, Inc., "[G-PCC][New Proposal] Layer structure based PCC slice segmentation", XP030207417, ISO/IEC JTC1/SC29/WG11 MPEG2016/M49198, Jul. 2019, Gothenburg, Sweden.
Hyun-Mook Oh, LG Electronics, Inc., "[G-PCC] Slice segmentation considering coding layers", XP030292863, ISO/IEC JTC 1/SC 29/WG7 m55350, Online, Oct. 2020.

* cited by examiner

FIG. 2

FIG. 3
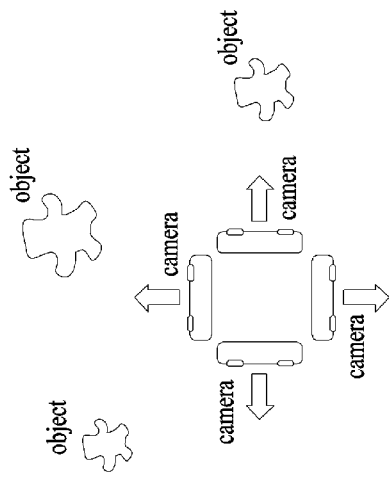
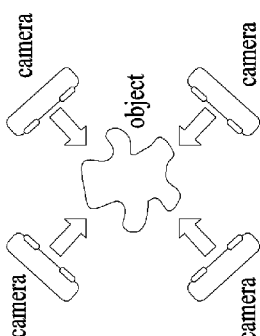

FIG. 7
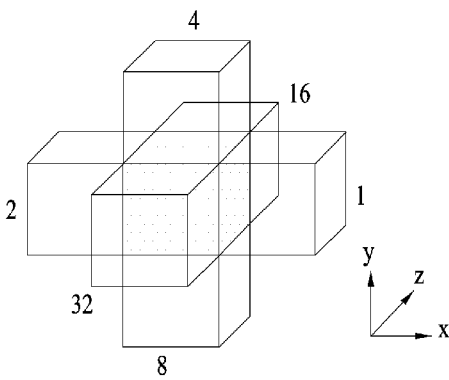
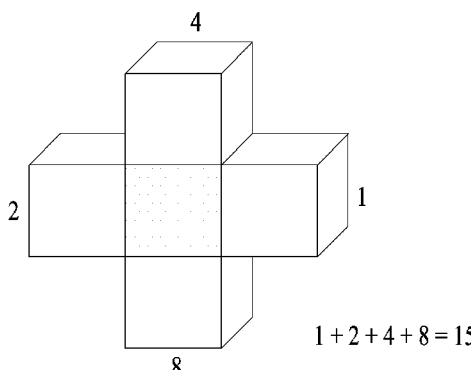
$$1 + 2 + 4 + 8 = 15$$

Level of details

FIG. 17

| Geo data | G | LoD(0)~LoD(N) |
| Attr data | A | LoD(0)~LoD(N) |

| seq_parameter_set( ) { | Descriptor |
|---|---|
| ...... | |
| scalable_transmission_enable_flag | u(1) |
| ...... | |
| } | |

| geometry_parameter_set( ) { | Descriptor |
|---|---|
| ...... | |
| if(scalable_transmission_enable_flag ) { | |
| geom_scalable_transmission_enable_flag | u(1) |
| if( geom_scalable_transmission_enable_flag ) { | |
| num_scalable_layers | ue(v) |
| for(i=0; i<num_scalable_layers; i++) { | |
| scalable_layer_id[i] | u(8) |
| if(geom_tree_type == 0 ) // octree | |
| num_octree_layers_in_scalable_layer[i] | u(8) |
| tree_depth_start[i] | u(8) |
| tree_depth_end[i] | u(8) |
| node_size[i] | u(8) |
| num_nodes[i] | u(8) |
| } | |
| num_slices_in_scalable_layer[i] | u(8) |
| for( j=0; j<num_slices_in_scalable_layers; j++) | |
| slice_id[i][j] | u(8) |
| } | |
| } | |
| } | |
| ...... | |
| } | |

FIG. 26

| attribute_parameter_set( ) { | Descriptor |
|---|---|
| ...... | |
| if(scalable_transmission_enable_flag ) { | |
| attr_scalable_transmission_enable_flag | u(1) |
| if( attr_scalable_transmission_enable_flag ) { | |
| aligned_slice_structure_enabled_flag | u(1) |
| if( aligned_slice_structure_enabled_flag ) { | |
| num_scalable_layers | ue(v) |
| for(i=0; i<num_scalable_layers; i++) | |
| num_slices_in_scalable_layer[i] | u(8) |
| for( j=0; j<num_slices_in_scalable_layers; j++) | |
| slice_id_offsets[i][j] | u(8) |
| } | |
| else { | |
| num_scalable_layers | ue(v) |
| for(i=0; i<num_scalable_layers; i++) { | |
| scalable_layer_id[i] | u(8) |
| corresponding_geom_scalable_layer[i] | u(8) |
| num_octree_layers_in_scalable_layer[i] | u(8) |
| tree_depth_start[i] | u(8) |
| tree_depth_end[i] | u(8) |
| node_size[i] | u(8) |
| num_nodes[i] | u(8) |
| num_slices_in_scalable_layer[i] | u(8) |
| for( j=0; j<num_slices_in_scalable_layers; j++) | |
| slice_id[i][j] | u(8) |
| } | |
| } | |
| } | |
| } | |
| ...... | |
| } | |

FIG. 27

| geometry_data_unit_header( ) { | Descriptor |
|---|---|
| ...... | |
| slice_id | u(8) |
| if( geom_scalable_transmission_enable_flag ) { | |
| scalable_layer_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| } | |
| } | |
| ref_slice_id | u(8) |
| ...... | |
| } | |

FIG. 28

| attribute_data_unit_header( ) { | Descriptor |
|---|---|
| ...... | |
| slice_id | u(8) |
| if( attr_scalable_transmission_enable_flag ) { | |
| if (aligned_slice_structure_enabled_flag ) | |
| aligned_geom_data_unit_id | u(8) |
| else { | |
| scalable_layer_id | u(8) |
| num_tree_depth_in_data_unit | u(8) |
| for(i=0; i<num_tree_depth_in_data_unit; i++) { | |
| tree_depth[i] | u(8) |
| num_nodes[i] | u(8) |
| } | |
| } | |
| } | |
| ref_slice_id | u(8) |
| ...... | |
| } | |

FIG. 33
Geometry tree structure contained in a single slice
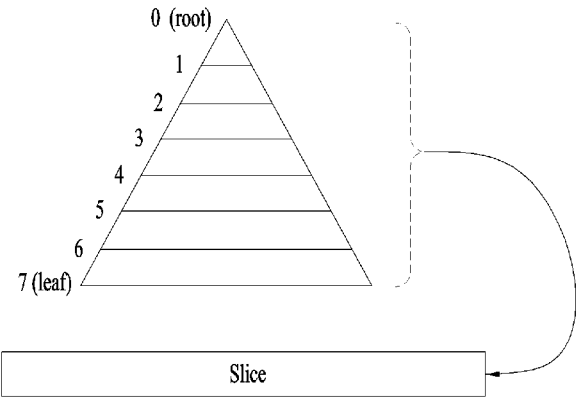
Geometry tree structure contained in segmented slices
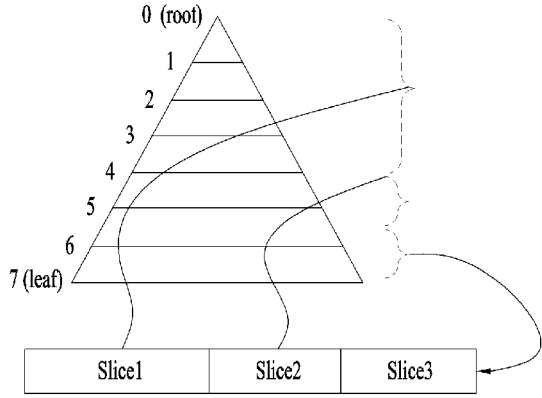

| geometry_parameter_set( ) { | Descriptor |
|---|---|
| ...... | |
| num_layer_groups_minus1 | u(8) |
| for(i=0; i<=num_layer_groups_minus1; i++) { | |
| layer_group_id[i] | u(8) |
| num_tree_depth[i] | u(8) |
| num_subgroups[i] | u(8) |
| } | |
| ...... | |
| } | |

| attribute_parameter_set( ) { | Descriptor |
|---|---|
| ...... | |
| aligned_layer_group_structure_flag | u(1) |
| if( aligned_layer_group_structure_flag ) | |
| geom_parameter_set_id | |
| else { | |
| num_groups_minus1 | u(8) |
| for(i=0; i<=num_groups_minus1; i++) { | |
| layer_group_id[i] | u(8) |
| num_tree_depth_minus1[i] | u(8) |
| num_subgroups_minus1[i] | u(8) |
| } | |
| } | |
| ...... | |
| } | |

FIG. 37

| geometry_data_unit_header( ) { | Descriptor |
|---|---|
| ...... | |
|    layer_group_id | u(8) |
|    subgroup_id | u(8) |
|    ...... | |
| } | |

| attribute_data_unit_header( ) { | Descriptor |
|---|---|
| ...... | |
|    layer_group_id | u(8) |
|    subgroup_id | u(8) |
|    ...... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD THAT INCLUDE SCALABILITY ENABLE FLAG INFORMATION

CROSS-REFERENCE TO RELATED APPLICATIONS

This application is the National Stage filing under 35 U.S.C. 371 of International Application No. PCT/KR2021/013722, filed on Oct. 6, 2021, which claims the benefit of earlier filing date and right of priority to Korean Patent Application No. 10-2020-0128676, filed on Oct. 6, 2020 and U.S. Provisional Application No. 63/088,998, filed on Oct. 7, 2020, the contents of which are all hereby incorporated by reference herein in their entirety.

TECHNICAL FIELD

Embodiments relate to a method and device for processing point cloud content.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

To achieve these objects and other advantages and in accordance with the purpose of the disclosure, as embodied and broadly described herein, a method of transmitting point cloud data may include encoding the point cloud data, and transmitting a bitstream containing the point cloud data. A method of receiving point cloud data according to embodiments may include receiving a bitstream containing point cloud data and decoding the point cloud data.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 2 is a block diagram illustrating a point cloud content providing operation according to embodiments;

FIG. 3 illustrates an exemplary process of capturing a point cloud video according to embodiments;

FIG. 7 shows an example of a neighbor node pattern according to embodiments;

FIG. 17 illustrates a geometry bitstream structure and attribute bitstream structure according to embodiments;

FIG. 19 illustrates a bitstream arrangement method according to embodiments;

FIG. 23 illustrates a method of configuring a slice containing point cloud data according to embodiments;

FIG. 25 shows syntax of a sequence parameter set and a geometry parameter set according to embodiments;

FIG. 26 shows syntax of an attribute parameter set according to embodiments;

FIG. 27 shows syntax of a geometry data unit header according to embodiments;

FIG. 28 shows syntax of an attribute data unit header according to embodiments;

FIG. 33 illustrates a single slice-based geometry tree structure and segmented slice-based geometry tree structure according to embodiments;

FIG. 34 illustrates a layer group structure of a geometry coding tree and an aligned layer group structure of an attribute coding tree according to embodiments;

FIG. 35 illustrates a layer group structure of a geometry tree and an independent layer group structure of an attribute coding tree according to embodiments;

FIG. 36 shows syntax of parameter sets according to embodiments;

FIG. 37 shows a geometry data unit header according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
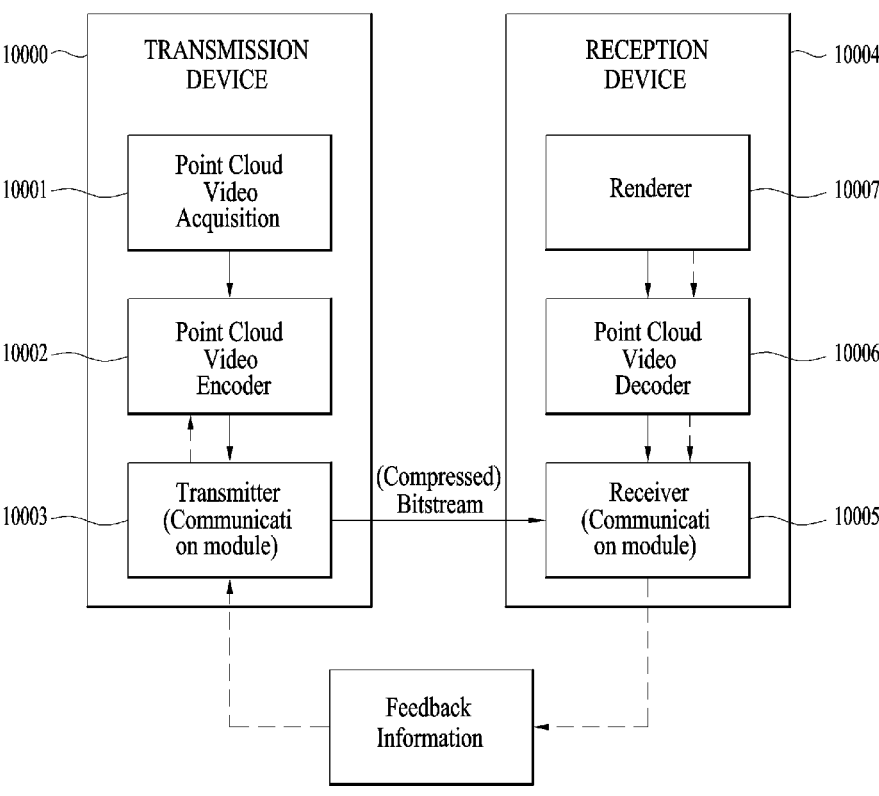
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/ segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/ or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
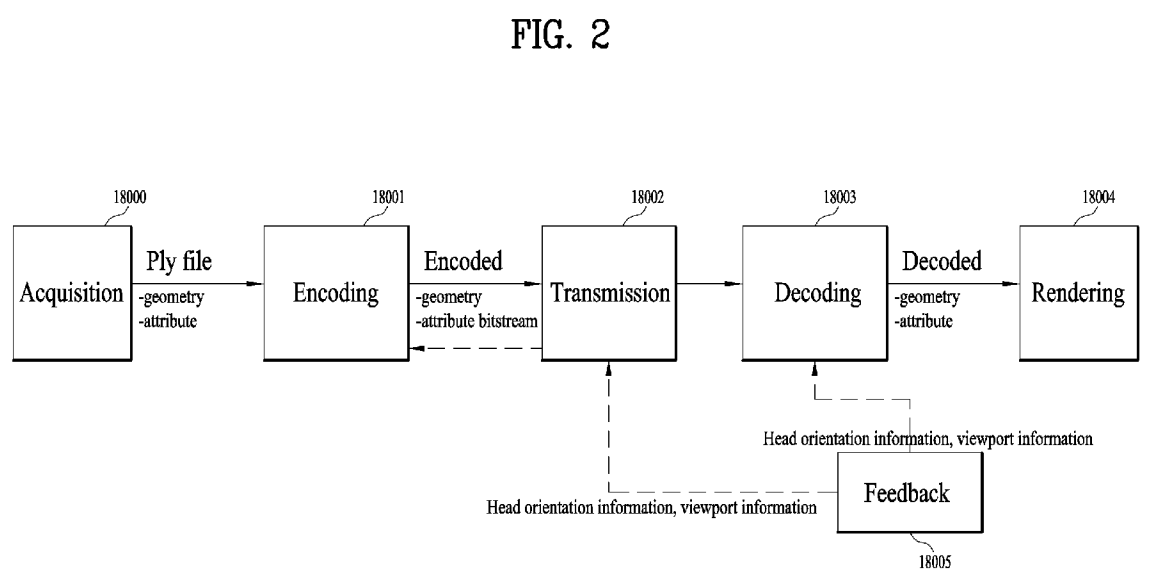

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
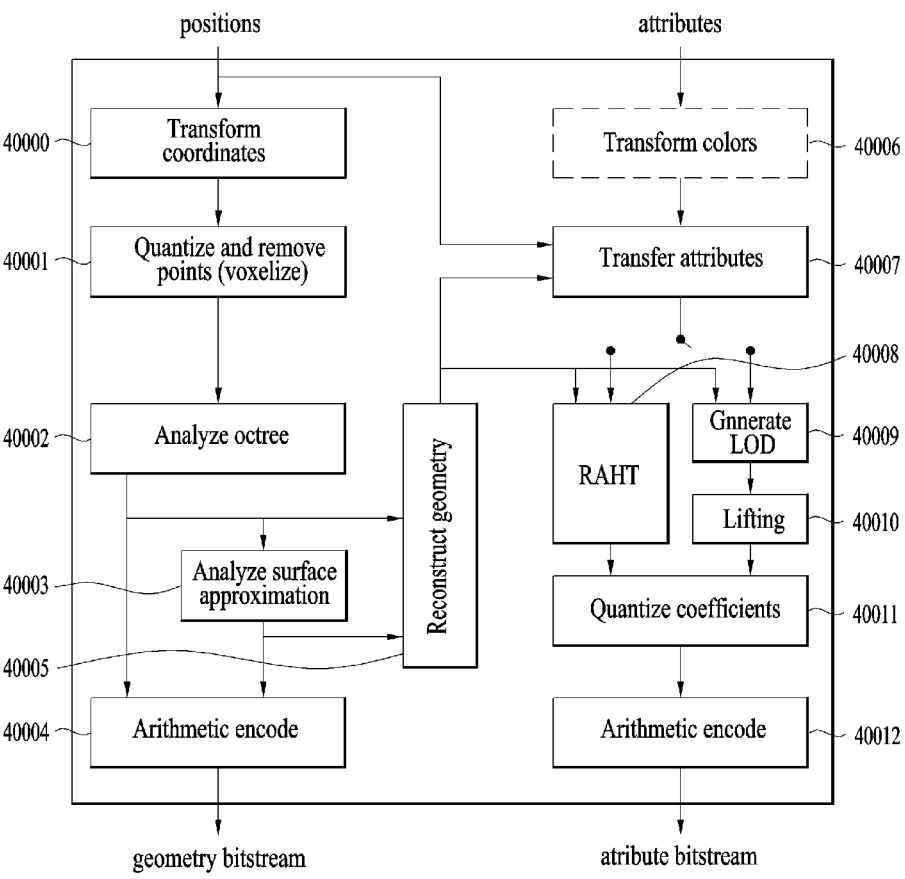
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and inter-polation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodi-ments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyz-ing the distribution of points. The reconstructed octree/voxels may be referred to as reconstructed geometry (re-stored geometry).

The attribute transformer 40007 according to the embodi-ments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflec-tance of each point) within a specific position/radius from the position (or position value) of the center of each voxel. The attribute transformer 40007 may apply a weight accord-ing to the distance from the center to each point in calcu-lating the average. Accordingly, each voxel has a position and a calculated attribute (or attribute value).

The attribute transformer 40007 may search for neigh-boring points existing within a specific position/radius from the position of the center of each voxel based on the K-D tree or the Morton code. The K-D tree is a binary search tree and supports a data structure capable of managing points based on the positions such that nearest neighbor search (NNS) may be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1)

is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodi-ments performs RAHT coding for predicting attribute infor-mation based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodi-ments performs lifting transform coding of transforming the attributes a point cloud based on weights. As described above, lifting transform coding may be optionally applied.

The coefficient quantizer 40011 according to the embodi-ments quantizes the attribute-coded attributes based on coefficients.

The arithmetic encoder 40012 according to the embodi-ments encodes the quantized attributes based on arithmetic coding.

Although not shown in the figure, the elements of the point cloud encoder of FIG. 4 may be implemented by hardware including one or more processors or integrated circuits configured to communicate with one or more memo-ries included in the point cloud providing device, software, firmware, or a combination thereof. The one or more pro-cessors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
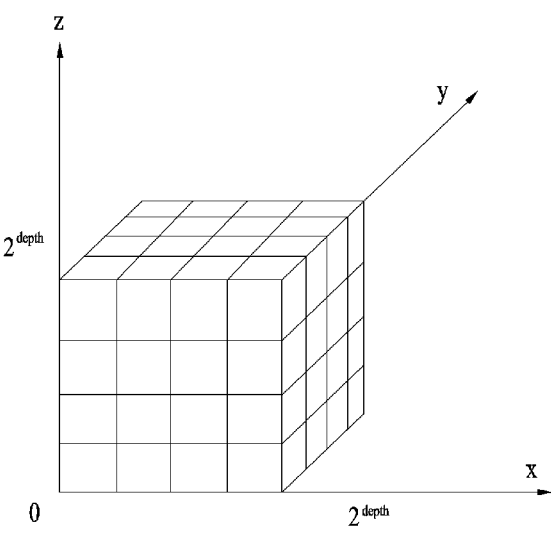
FIG. 5 shows an example of voxels according to embodiments.

FIG. 5 shows an example of voxels according to embodi-ments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and $(2^d, 2^d, 2^d)$ is recursively subdivided. One voxel includes at least one point. The spatial coordinates of a voxel may be estimated from the positional relationship with a voxel group. As described above, a voxel has an attribute (such as color or reflectance) like pixels of a 2D image/ video. The details of the voxel are the same as those described with reference to FIG. 4, and therefore a description thereof is omitted.

Figure 6:
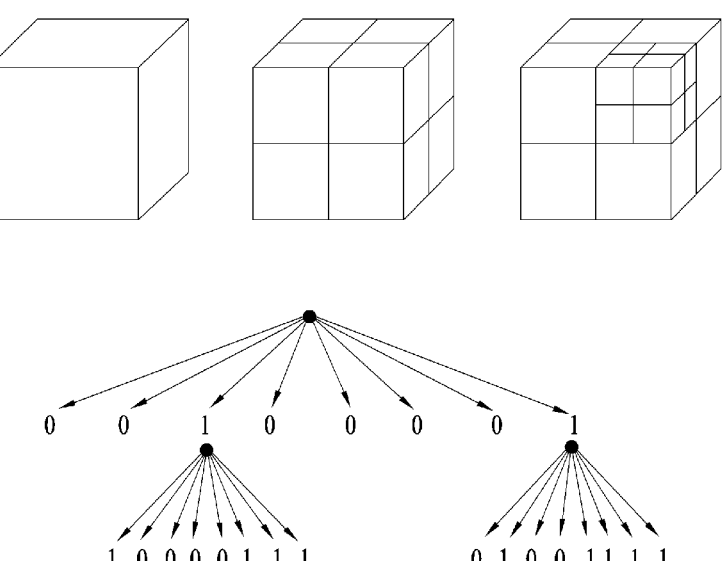
FIG. 6 shows an example of an octree and occupancy code according to embodiments.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log } 2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x$, $\Delta y$, $\Delta z$) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$\begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \qquad \text{i)}$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \qquad \text{ii)}$$

$$\begin{bmatrix} \sigma_x^2 \\ \sigma_y^2 \\ \sigma_z^2 \end{bmatrix} = \sum_{i=1}^{n} \begin{bmatrix} \bar{x}_i^2 \\ \bar{y}_i^2 \\ \bar{z}_i^2 \end{bmatrix} \qquad \text{iii)}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of $\theta$ is estimated through a tan 2(bi, ai), and the vertices are ordered based on the value of $\theta$. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

| | Triangles formed from vertices ordered 1, . . . , n | |
| --- | --- |
| n | triangles |
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |

TABLE 2-1-continued

| | Triangles formed from vertices ordered 1, . . . , n | |
| --- | --- |
| n | triangles |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
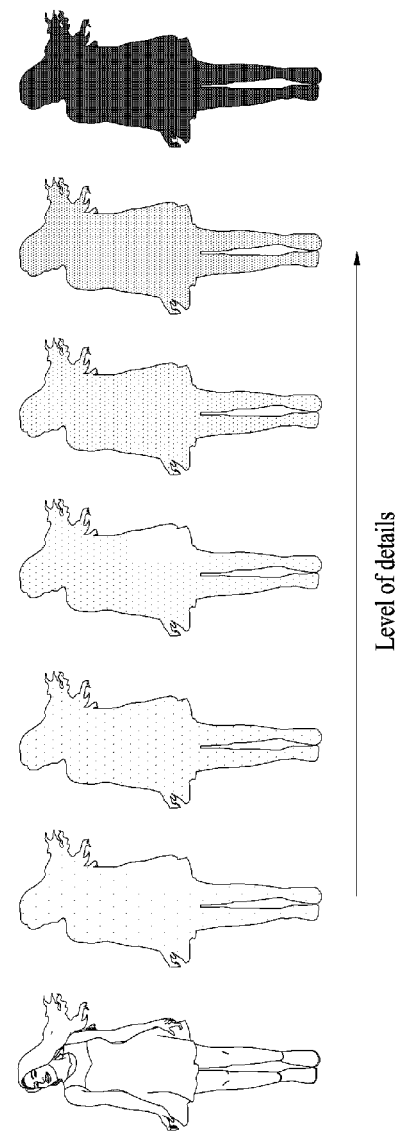
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
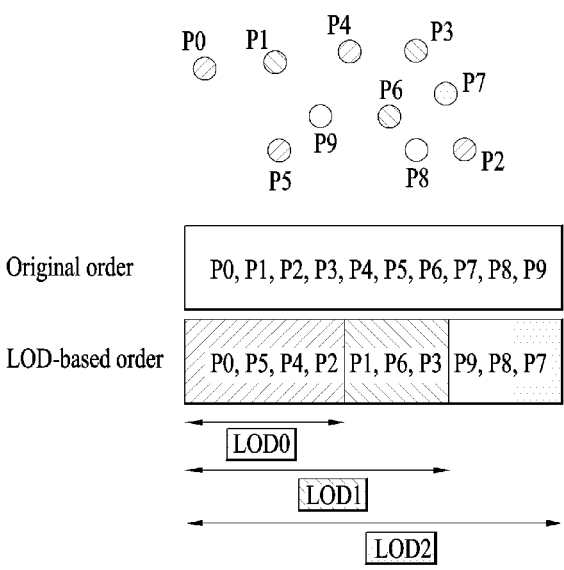
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

| Attribute prediction residuals quantization pseudo code |
|---|

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE

| Attribute prediction residuals inverse quantization pseudo code |
|---|

```
int PCCInverseQuantization(int value, int quantStep) {
if( quantStep ==0) {
return value;
} else {
return value * quantStep;
}
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1\,w2} \begin{bmatrix} g_{l_{2x,y,z}} \\ g_{l_{2x+1,y,z}} \end{bmatrix},$$

$$T_{w1\,w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}}=w_{l_{2x,y,z}}+w_{l_{2x+1,y,z}}$. The root node is created through the $g_{1_{0,0,1}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
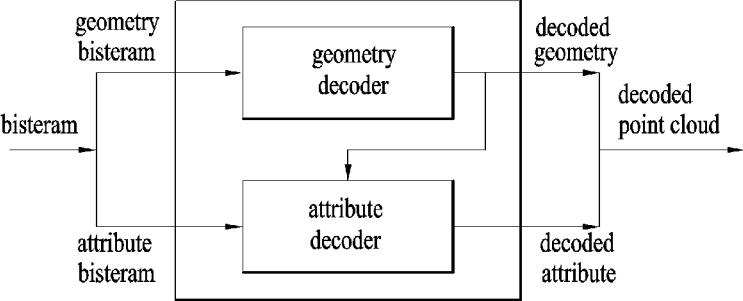
FIG. 10 illustrates a point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
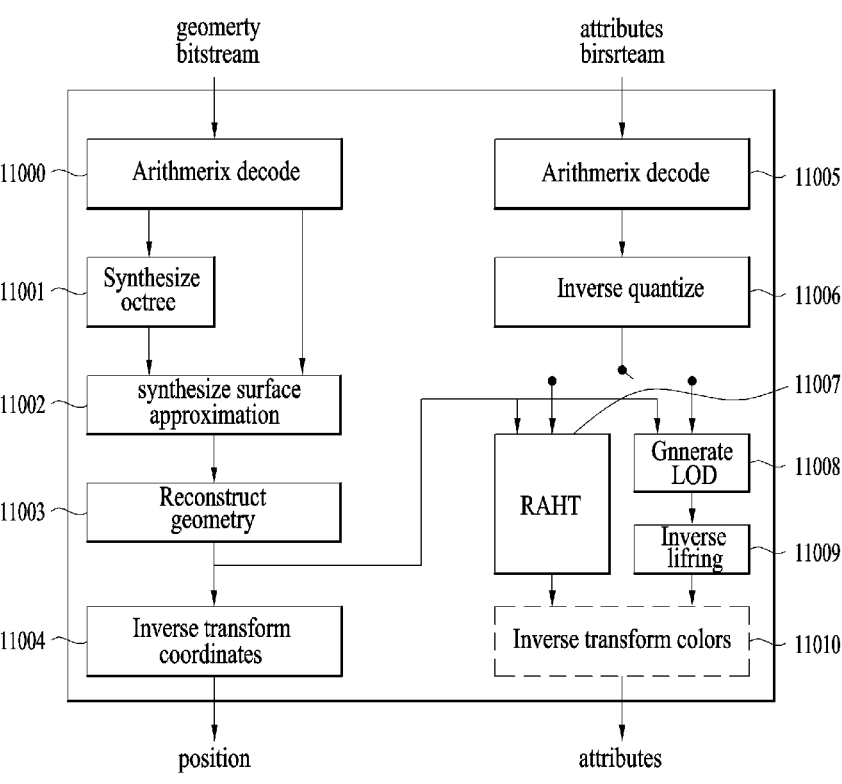
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
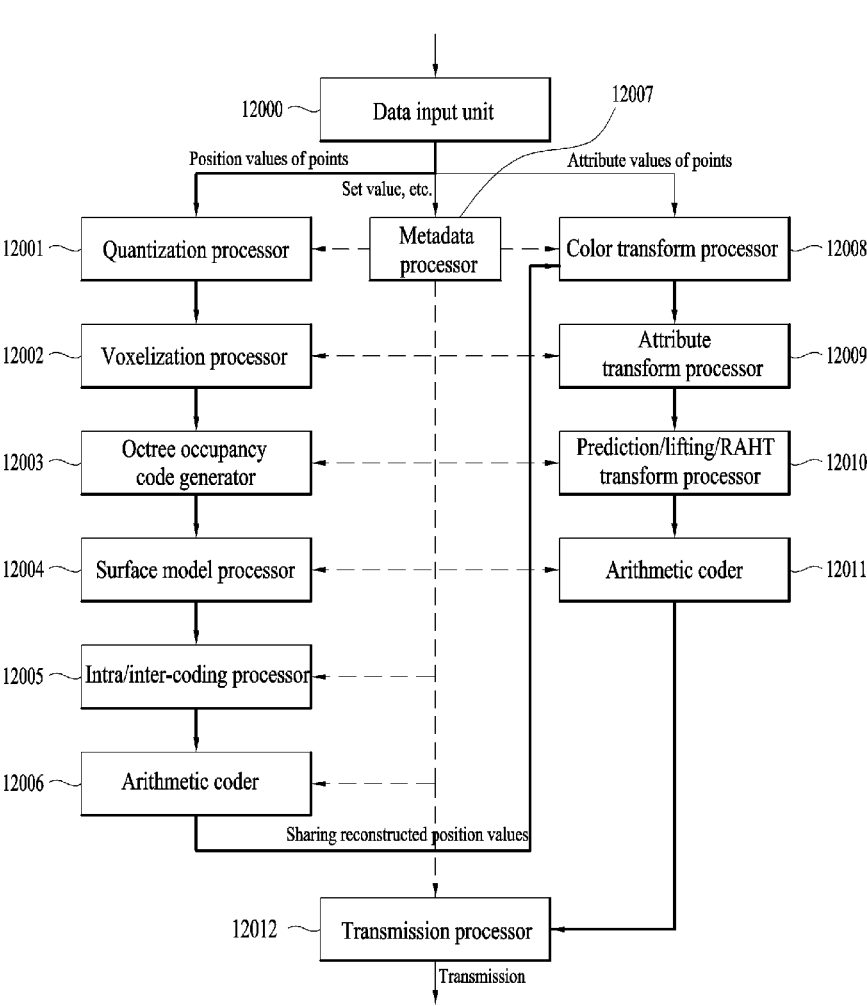
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
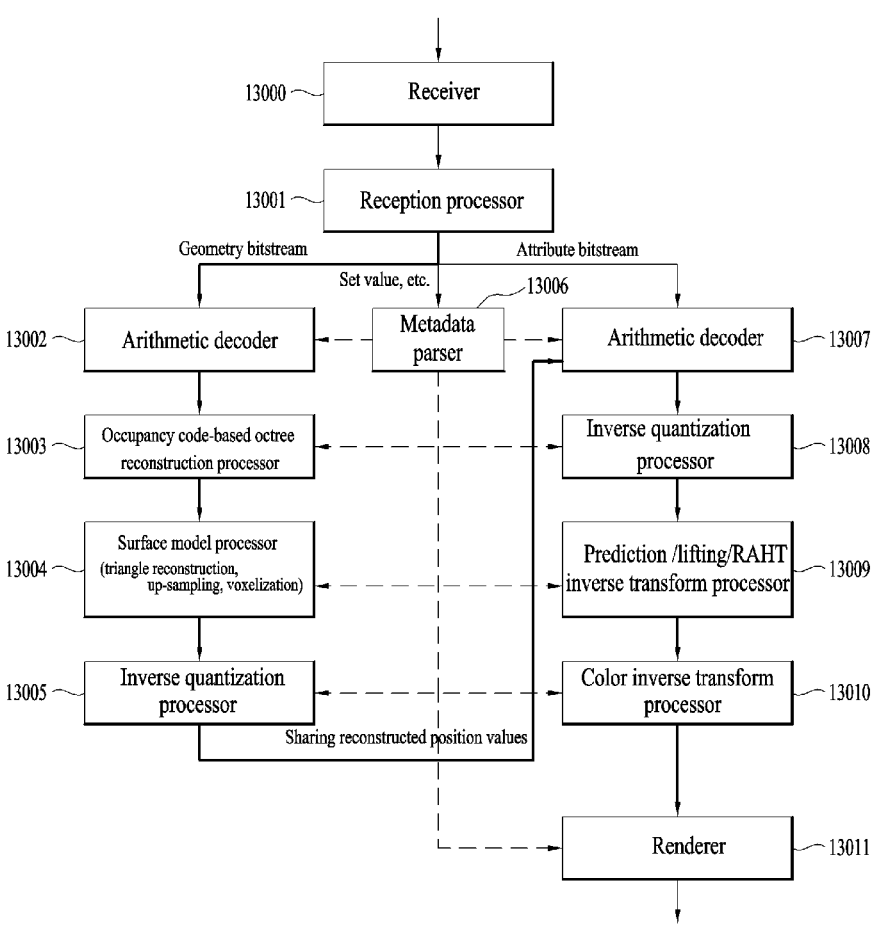
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
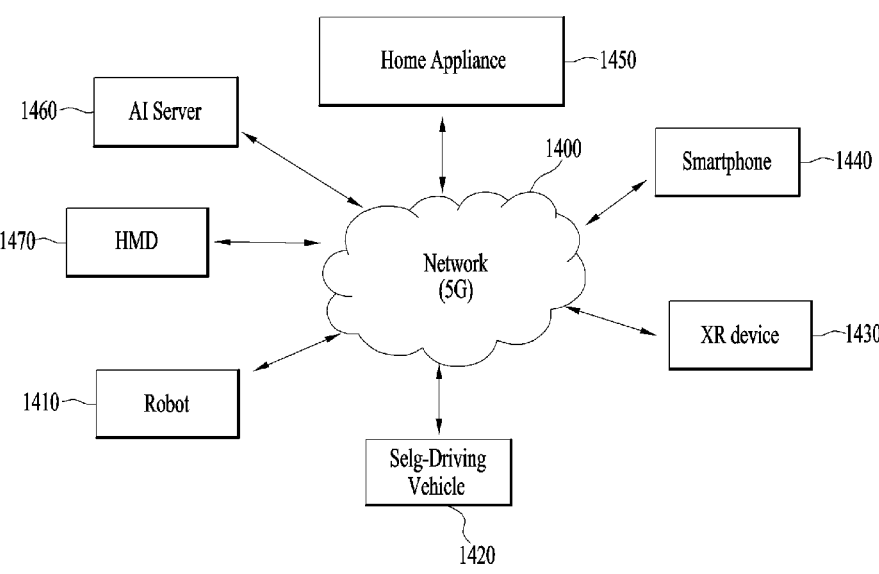
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 18:
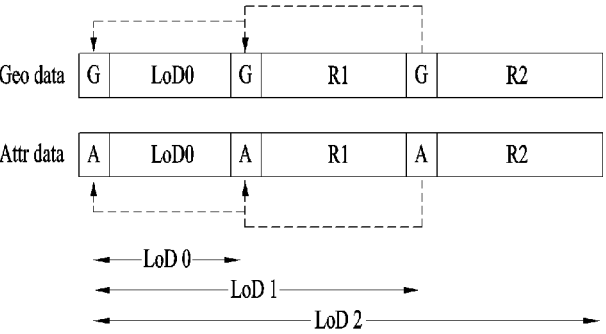
FIG. 18 illustrates a bitstream configuration according to embodiments.
Figure 30:
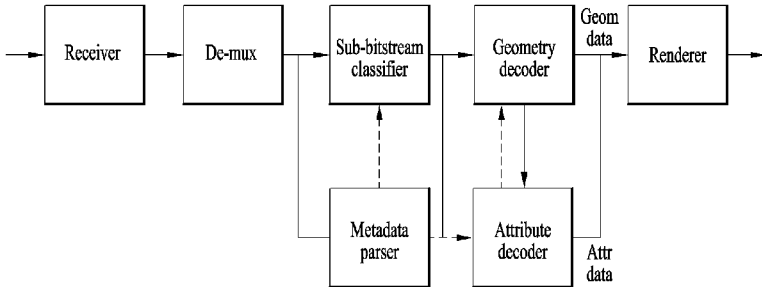
FIG. 30 illustrates a structure of a point cloud data reception device according to embodiments.

The point cloud data transmission method/device according to embodiments may be construed as a term referring to the transmission device 10000 in FIG. 1, the point cloud video encoder 10002 in FIG. 1, the transmitter 10003 in FIG. 1, the acquisition 20000/encoding 20001/transmission 20002 in FIG. 2, the encoder in FIG. 4, the transmission device in FIG. 12, the device in FIG. 14, the encoder in FIG. 18, the transmission method in FIG. 30, and the like.

Figure 19:
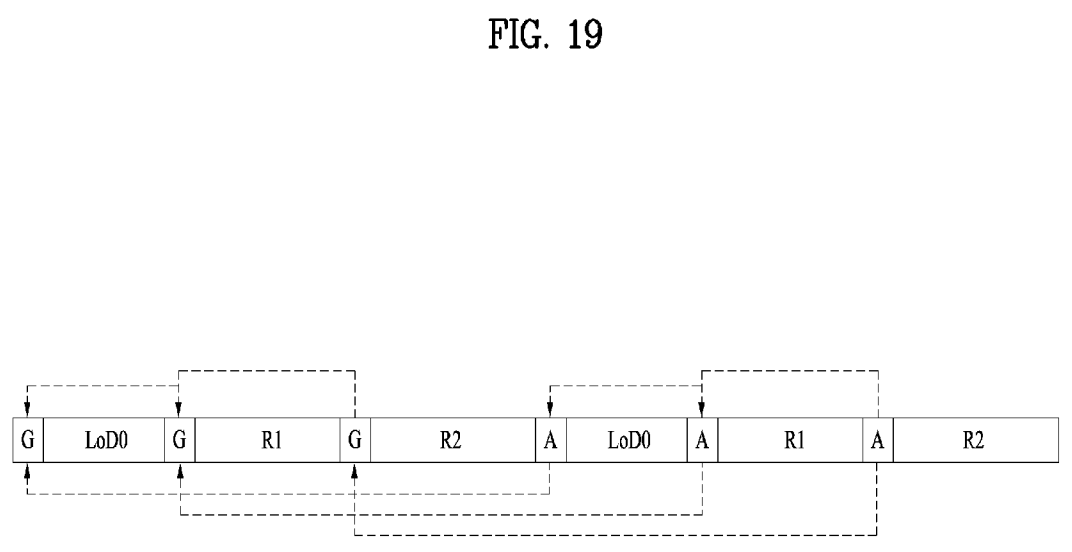
Figure 31:
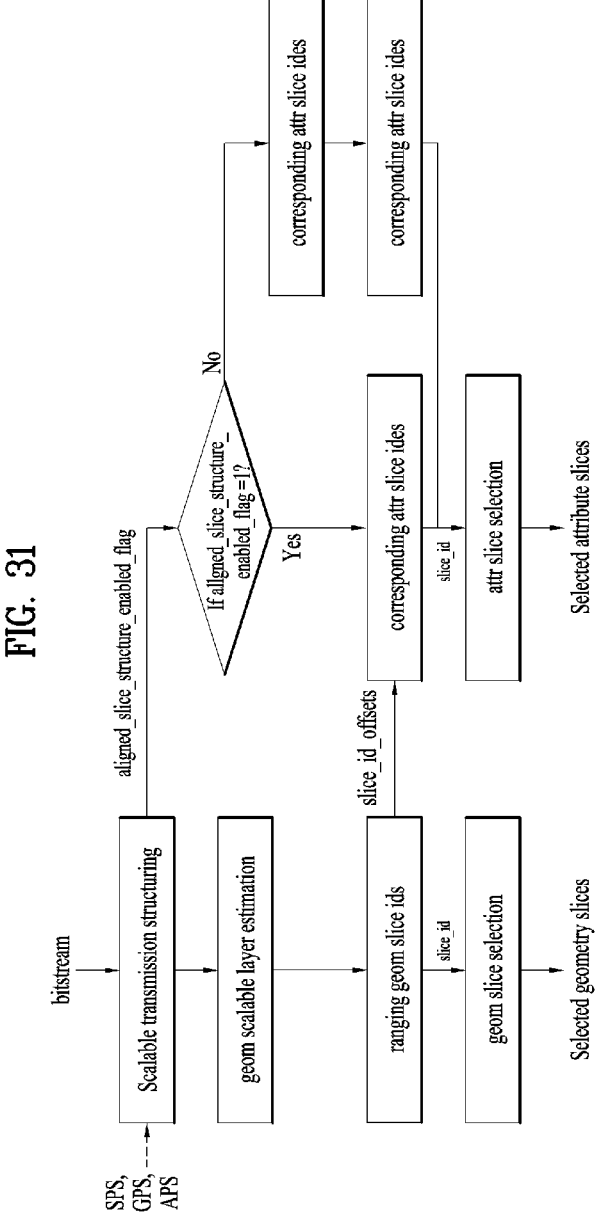
FIG. 31 is a flowchart illustrating a point cloud data reception device according to embodiments.

The point cloud data reception method/device according to embodiments may be construed as a term referring to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like.

The method/device for transmitting or receiving point cloud data according to the embodiments may be referred to simply as a method/device.

According to embodiments, geometry data, geometry information, and position information constituting point cloud data are to be construed as having the same meaning. Attribute data, attribute information, and attribute information constituting the point cloud data are to be construed as having the same meaning.

The method/device according to embodiments may process point cloud data based on the point cloud data structure according to embodiments in consideration of scalable transmission.

Regarding the method/device according to the embodiments, described herein is a method for efficiently supporting selective decoding of a part of data when the selective decoding is needed due to receiver performance or transmission speed in transmitting and receiving point cloud data. The proposed method proposes a method to select information needed or eliminate unnecessary information in the bitstream unit by dividing the geometry and attribute data delivered in units of data into semantic units such as geometry octree and level of detail (LoD).

A technique for configuring a data structure composed of a point cloud according to embodiments is described. Specifically, embodiments disclose methods for packing and processing of related signaling information for effectively delivering PCC data configured based on layers will be described, and propose a method to apply the same to scalable PCC-based services.

Referring to the point cloud data transmission device/ reception device (or referred to simply as an encoder/ decoder) according to the embodiments shown in FIGS. 4 and 11, point cloud data is composed of a position (e.g., XYZ coordinates) and attributes (e.g., color, reflectance, intensity, grayscale, opacity, etc.) of each datum. In point cloud compression (PCC), octree-based compression is performed to efficiently compress distribution characteristics of uneven distribution in three-dimensional space, and attribute information is compressed based thereon. The PCC transmission/reception device illustrated in FIGS. 4 and 11 may process operation(s) according to embodiments through each component device.

Figure 15:
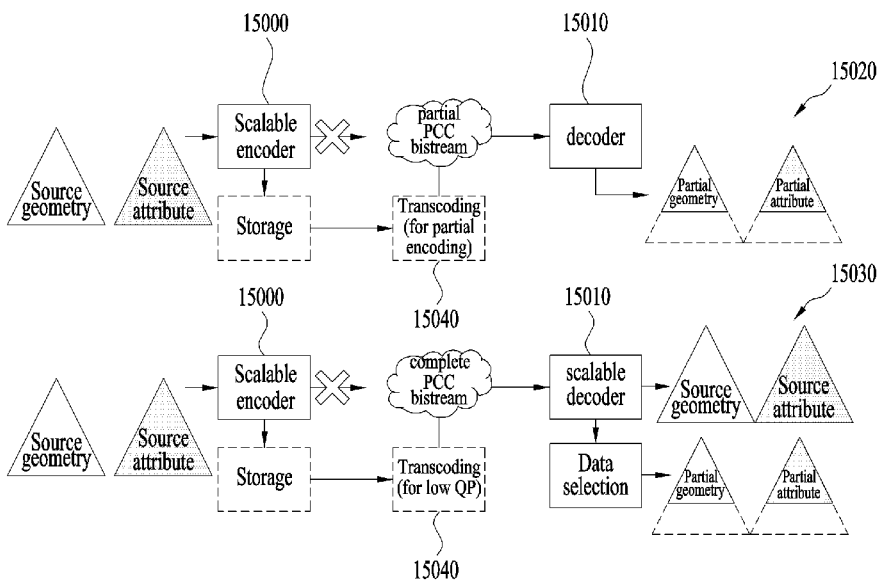
FIG. 15 illustrates a process of encoding, transmitting, and decoding point cloud data according to embodiments.

FIG. 15 illustrates a process of encoding, transmission, and decoding point cloud data according to embodiments.

A point cloud encoder 15000 is a transmission device carrying out a transmission method according to embodiments, and may scalably encode and transmit point cloud data.

A point cloud decoder 15010 is a reception device carrying out a reception method according to embodiments, and may scalably decode the point cloud data.

Source data received by the encoder 15000 may include geometry data and/or attribute data.

The encoder 15000 scalably encodes the point cloud data, but does not immediately generate a partial PCC bitstream. Instead, when it receives full geometry data and full attribute data, it stores the data in a storage connected to the encoder. Then, the encoder may perform transcoding for partial encoding, and generate and transmit a partial PCC bitstream. The decoder 15010 may receive and decode the partial PCC bitstream to reconstruct partial geometry and/or partial attributes.

Upon receiving the full geometry and full attributes, the encoder 15000 may store the data in the storage connected to the encoder, and transcode the point cloud data with a low quantization parameter (QP) to generate and transmit a complete PCC bitstream. The decoder 15010 may receive and decode the complete PCC bitstream to reconstruct full geometry and/or full attributes. The decoder 15010 may select a partial geometry and/or a partial attribute from the complete PCC bitstream through data selection.

The method/device according to the embodiment compresses and transmits the point cloud data by dividing the position information about data points and feature information such as color/brightness/reflectance, which are the point cloud data, into geometry information and attribute information. In this case, an octree structure having layers may be configured according to the degree of detail or PCC data may be configured according to levels of detail (LoDs). Then, scalable point cloud data coding and representation may be performed based the configured structure or data. In this case, only a part of the point cloud data may be decoded or represented due to the performance of the receiver or the transfer rate.

In this process, the method/device according to the embodiments may remove unnecessary data in advance. In other words, when only a part of the scalable PCC bitstream needs to be transmitted (i.e., only some layers are decoded in scalable decoding), there is no way to select and send only the necessary part. Therefore, 1) the necessary part needs to be re-encoded (15020) after decoding, or 2) the receiver must selectively apply an operation after the whole data is transferred thereto (15030). However, in case 1), delay may occur due to the time for decoding and re-encoding (15020). In case 2), bandwidth efficiency may be degraded due to transmission of unnecessary data. Further, when a fixed bandwidth is used, data quality may need to be lowered for transmission (15030).

Accordingly, the method/device according to the embodiments may define a slice segmentation structure of point cloud data, and signal a scalable layer and slice structure for scalable transmission.

In embodiments, to ensure efficient bitstream delivery and decoding, the bitstream may be divided into specific units to be processed.

The unit according to the embodiments may be referred to as an LOD, a layer, a slice, or the like. LOD is the same term as LOD in attribute data coding, but may mean a data unit for a layered structure of a bitstream. It may be a concept corresponding to one depth or a bundle of two or more depths based on the hierarchical structure of point cloud data, for example, depths (levels) of an octree or multiple trees. Similarly, a layer is provided to generate a unit of a sub-bitstream, and is a concept that corresponds to one depth or a bundle of two or more depths, and may correspond to one LOD or two or more LODs. Also, a slice is a unit for configuring a unit of a sub-bitstream, and may correspond to one depth, a part of one depth, or two or more depths. Also, it may corresponds one LOD, a part of one LOD, or two or more LODs. According to embodiments, the LOD, the layer, and the slice may correspond to each other or one of the LOD, the layer, and the slice may be included in another one. Also, a unit according to embodiments may include an LOD, a layer, a slice, a layer group, or a subgroup, and may be referred to as complementary to each other.

Figure 16:
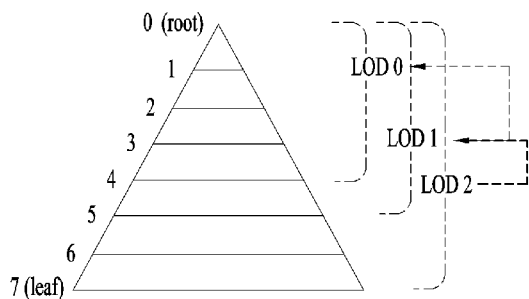
FIG. 16 illustrates a layer-based point cloud data configuration according to embodiments.

FIG. 16 illustrates a layer-based point cloud data configuration according to embodiments.

The transmission method/device according to the embodiments may configure layer-based point cloud data as shown in FIG. 16 to encode and decode the point cloud data.

Layering of point cloud data may have a layer structure in terms of SNR, spatial resolution, color, temporal frequency, bit depth, or the like depending on the application field, and may construct layers in a direction in which data density increases based on the octree structure or LoD structure.

Figure 17:
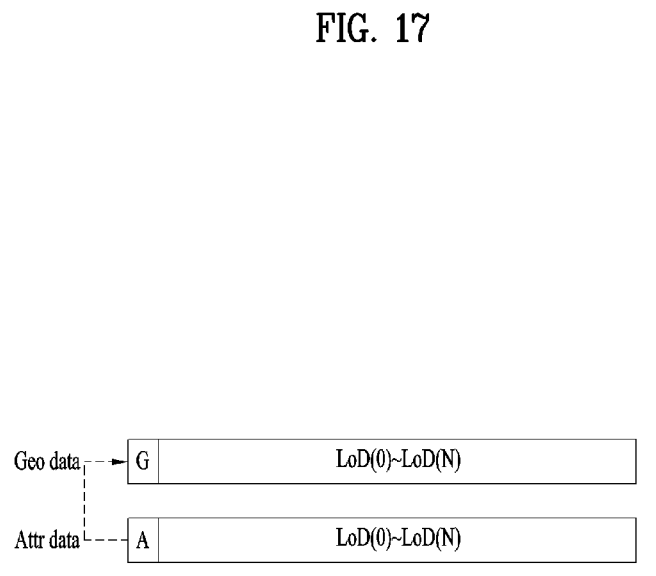

FIG. 17 illustrates a geometry bitstream structure and attribute bitstream structure according to embodiments.

The methods/devices according to embodiments may configure, encode, and decode the geometry bitstream and attribute bitstream shown in FIG. 17 based on the layering shown in FIG. 16.

A bitstream acquired through point cloud compression by the transmission device/encoder according to the embodiments may be divided into a geometry data bitstream and an attribute data bitstream according to the type of data and transmitted.

Each bitstream according to the embodiments may be composed of slices. Regardless of layer information or LoD information, the geometry data bitstream and the attribute data bitstream may each be configured as one slice and delivered. In this case, when only a part of the layer or LoD is to be used, operations of 1) decoding the bitstream, 2) selecting only a desired part and removing unnecessary parts, and 3) performing encoding again based on only the necessary information should be performed.

FIG. 18 illustrates a bitstream configuration according to embodiments.

The transmission method/device according to the embodiments may generate a bitstream as shown in FIG. 18, and the reception method/device according to the embodiments may decode point cloud data contained in the bitstream as shown in FIG. 18.

Bitstream Configuration According to Embodiments

In embodiments, in order to avoid unnecessary intermediate processes, a bitstream may be divided into layers (or LoDs) and transmitted.

For example, in the case of LoD-based PCC technology, a low LoD is included in a high LoD. Information contained in the current LoD but not in the previous LoD, i.e., information newly added to each LoD, may be referred to as R (Rest). As shown in FIG. 18, initial LoD information and information R newly added in each LoD may be divided into independent units and transmitted.

The transmission method/device according to the embodiments may encode geometry data and generate a geometry bitstream. The geometry bitstream may be configured for each LOD or layer. The geometry bitstream may include a header (geometry header) for each LOD or layer. The header may include reference information for the next LOD or the next layer. The current LOD (layer) may further include information R (geometry data) not included in the previous LOD (layer).

The reception method/device according to the embodiments may encode attribute data and generate an attribute bitstream. The attribute bitstream may be configured for each LOD or layer, and the attribute bitstream may include a header (attribute header) for each LOD or layer. The header may include reference information for the next LOD or the next layer. The current LOD (layer) may further include information R (attribute data) not included in the previous LOD (layer).

The reception method/device according to the embodiments may receive a bitstream composed of LODs or layers and efficiently decode only necessary data without a complicated intermediate process.

FIG. 19 illustrates a bitstream arrangement method according to embodiments.

The method/device according to embodiments may arrange the bitstreams of FIG. 18 as shown in FIG. 19.

Bitstream Arrangement Method According to the Embodiments.

The transmission method/device according to the embodiments may transmit geometry and attributes in series as shown in FIG. 19 in transmitting a bitstream. In this case, the entire geometry information (geometry data) may be first sent according to the type of data, and then the attribute information (attribute data) may be transmitted. In this case, the geometry information may be quickly reconstructed based on the transmitted bitstream information.

In FIG. 19, for example, layers LODs containing geometry data may be first positioned in a bitstream, and layers LODs containing attribute data may be positioned behind the geometry layer. Since the attribute data depends on the geometry data, the geometry layer may be positioned first. In addition, the positions may be changed according to embodiments. Reference may be made between geometry headers and between the attribute header and the geometry headers.

Figure 20:
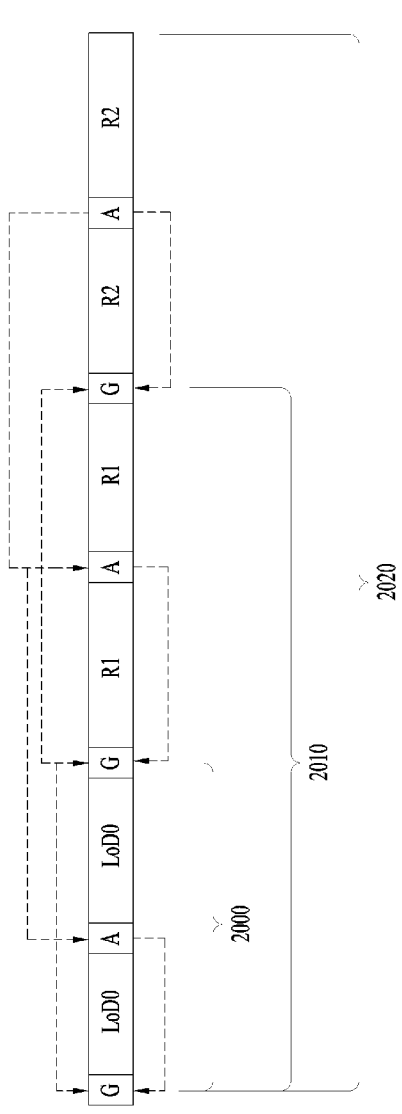
FIG. 20 illustrates a bitstream arrangement method according to embodiments.

FIG. 20 illustrates a bitstream arrangement method according to embodiments.

FIG. 20 is an example of bitstream arrangement according to embodiments, like FIG. 19.

Bitstreams constituting the same layer containing geometry data and attribute data may be grouped and transmitted. In this case, by using a compression technique capable of parallel decoding of geometry and attributes, decoding execution time may be shortened. In this case, information that needs to be processed first (small LoD, where geometry should precede attributes) may be placed first.

A first layer 2000 includes geometry data and attribute data corresponding to the smallest LOD 0 (Layer 0) together with each header, and a second layer 2010 includes LOD 0 (Layer 0), and includes geometry data and attribute data about points for new, more detailed layer 1 (LOD 1) that is not in LOD 0 (Layer 0) as R1 information. Similarly, a third layer 2020 may follow.

The transmission/reception method/device according to the embodiments may efficiently select a layer (or LoD) desired in the application field at a bitstream level when transmitting and receiving a bitstream. In grouping and transmitting geometry according to the bitstream arrangement method according to the embodiments (FIG. 19), there may be an empty part in the middle after selecting the bitstream level. In this case, the bitstream may need to be rearranged. When geometry and attributes are grouped and delivered according to the layers (FIG. 20), unnecessary information may be selectively removed according to the application field as follows.

Figure 21:
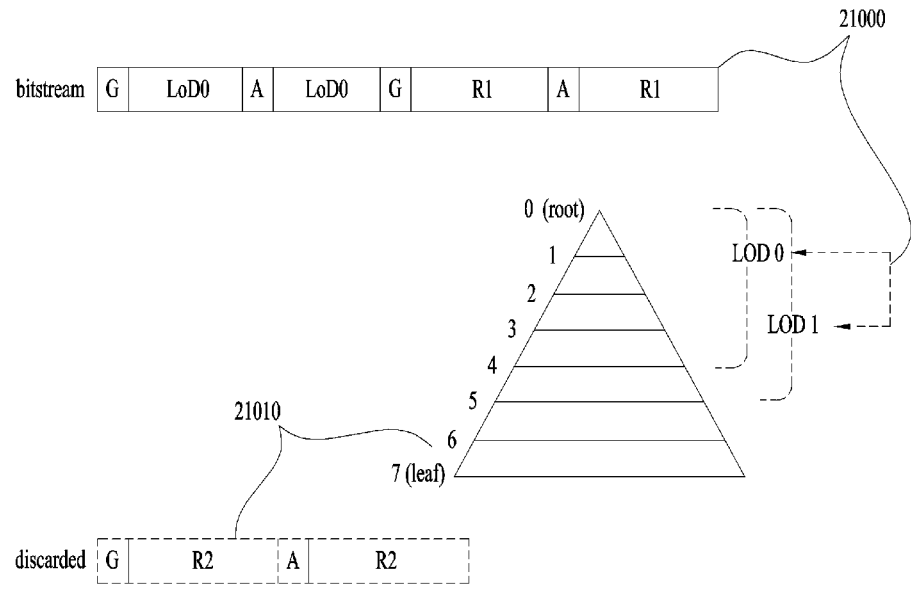
FIG. 21 illustrates a method of selecting geometry data and attribute data according to embodiments.

FIG. 21 illustrates a method of selecting geometry data and attribute data according to embodiments.

Bitstream Selection According to Embodiments

When a bitstream needs to be selected as described above, the method/device according to the embodiments may select data at the bitstream level as shown in FIG. 21: 1) symmetric selection of geometry and attributes; 2) asymmetrical selection of geometry and attributes; or 3) A combination of the above two methods.

1) Symmetric Selection of Geometry and Attributes

FIG. 21 illustrates a case where only LoD1 (LOD 0+R1) 21000 is selected and transmitted or decoded. In this case, information corresponding to R2 (new part of LOD 2) 21010 corresponding to a higher layer is removed in performing transmission and decoding.

Figure 22:
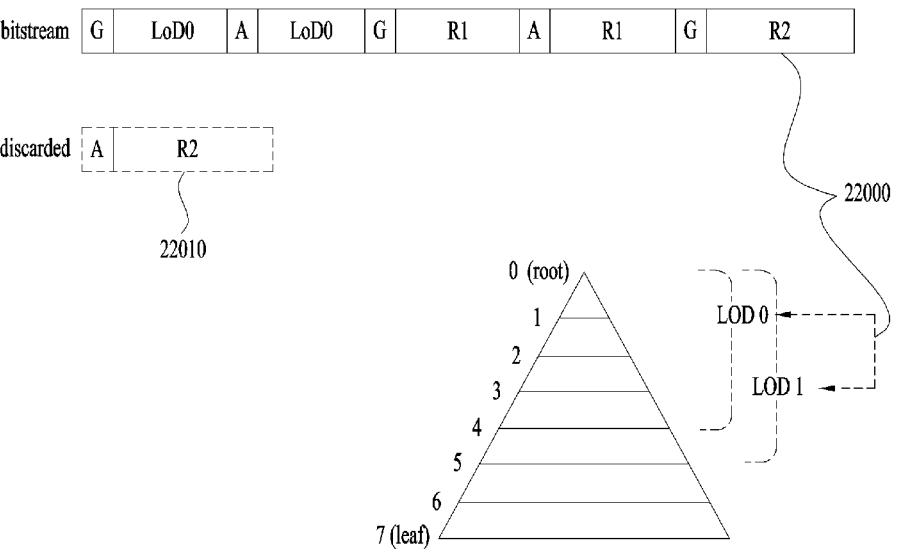
FIG. 22 illustrates a bitstream selection method according to embodiments.

FIG. 22 illustrates a bitstream selection method according to embodiments.

2) Asymmetric Selection of Geometry and Attributes

The method/device according to the embodiments may asymmetrically transmit geometry and attributes. Only the attributes of the upper layer (attribute R2 22000) may be removed and all of the geometries (level 0 (root level) to level 7 (leaf level) in the triangle octree structure) may be selected and transmitted/decoded (22010).

Referring to FIG. 16, when point cloud data is represented in an octree structure and hierarchically divided into LODs (or layers), scalable encoding/decoding (scalability) may be supported.

The scalability function according to the embodiments may include slice level scalability and/or octree level scalability.

The LoD (level of detail) according to the embodiments may be used as a unit for representing a set of one or more octree layers. In addition, it may mean a bundle of octree layers to be configured as a slice.

In attribute encoding/decoding, the LOD according to the embodiments may be extended and used as a unit for dividing data in detail in a broader sense.

That is, spatial scalability by an actual octree layer (or scalable attribute layer) may be provided for each octree layer. However, when scalability is configured in slices before bitstream parsing, selection may be made in LoDs according to embodiments.

In the octree structure, LOD0 may correspond to the root level to level 4, LOD1 may correspond to the root level to level 5, and LOD2 may correspond to the root level to level 7, which is the leaf level.

That is, as shown in FIG. 16, when scalability is utilized in slices, as in the case of scalable transmission, the provided scalable step may correspond to three steps of LoD0, LoD1, and LoD2, and the scalable step that may be provided by the octree structure in the decoding operation may correspond to eight steps from the root to the leaf.

According to embodiments, for example, in FIG. 16, when LoD0 to LoD2 are configured as respective slices, a transcoder (the transcoder 15040 of FIG. 15) of the receiver or the transmitter may select 1) LoD0 only, select 2) LoD0 and LoD1, or selct 3) LoD0, LoD1, and LoD2 for scalable processing.

Example 1: When only LoD0 is selected, the maximum octree level may be 4, and one scalable layer may be selected from among octree layers 0 to 4 in the decoding process. In this case, the receiver may consider a node size obtainable through the maximum octree depth as a leaf node, and may transmit the node size through signaling information.

Example 2: When LoD0 and LoD1 are selected, layer 5 may be added. Thus, the maximum octree level may be 5, and one scalable layer may be selected from among octree layers 0 to 5 in the decoding process. In this case, the receiver may consider a node size obtainable through the maximum octree depth as a leaf node, and may transmit the node size through signaling information.

According to embodiments, an octree depth, an octree layer, and an octree level may be a unit in which data is divided in detail.

Example 3: When LoD0, LoD1, and LoD2 are selected, layers 6 and 7 may be added. Thus, the maximum octree level may be 7, and one scalable layer may be selected from among octree layers 0 to 7 in the decoding process. In this case, the receiver may consider a node size obtainable through the maximum octree depth as a leaf node, and may transmit the node size through signaling information.

Figure 23:
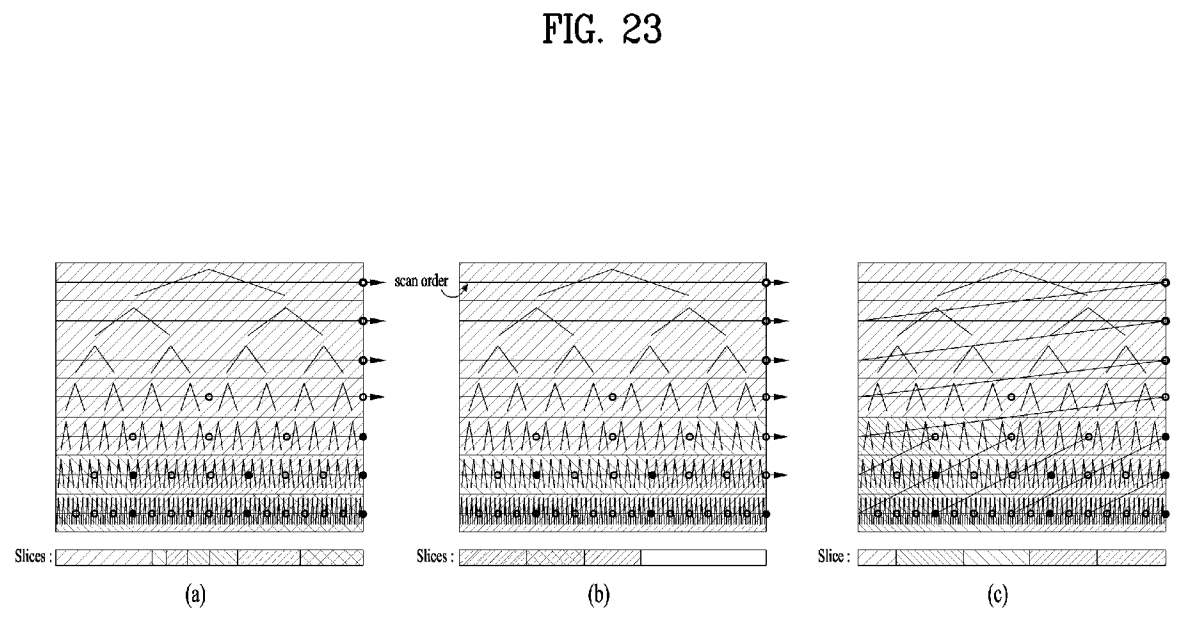

FIG. 23 illustrates a method of configuring a slice containing point cloud data according to embodiments.
Slice Configuration According to Embodiments The transmission method/device/encoder according to the embodiments may configure a G-PCC bitstream by segmenting the bitstream in a slice structure. A data unit for detailed data representation may be a slice.

For example, one or more octree layers may be matched to one slice.

The transmission method/device according to the embodiments, for example, the encoder may configure a bitstream based on the slice 2301 by scanning a node (point) contained in the octree in the direction of the scan order 2300.

FIG. 23-(a): A slice may contain some nodes of an octree layer.

The octree layer (e.g., level 0 to level 4) may constitute one slice 2002.

Partial data of an octree layer, for example, level 5 may constitute each slice 2003, 2004, 2005.

Partial data of an octree layer, for example, level 6 may constitute each slice.

FIGS. 23-(b) and 23-(c): When multiple octree layers are matched to one slice, only a part of nodes of each layer may be included. In this way, when multiple slices constitute one geometry/attribute frame, the information needed to configure layers may be delivered for the receiver. The information may include information about layers contained in each slice and information about nodes contained in each layer.

FIG. 23-(b): octree layers, for example, level 0 to level 3 and some data of level 4 may be configured in one slice.

Octree layers, for example, partial data of level 4 and partial data of level 5 may be configured as one slice.

Octree layers, for example, partial data of level 5 and partial data of level 6 may be configured as one slice.

An octree layer, for example, partial data of level 6 may be configured as one slice.

FIG. 23-(c): Data in octree layers, for example, level 0 to level 4 may be configured in one slice.

Some data of each of octree layers level 5, level 6, and level 7 may be configured in one slice.

An encoder according to embodiments and a device corresponding to the encoder may encode point cloud data and generate and transmit a bitstream containing encoded data and parameter information related to the point cloud data.

Furthermore, in generating a bitstream, a bitstream may be generated based on a bitstream structure (for example, see FIGS. 17 to 23 and the like) according to embodiments. Accordingly, a reception device, a decoder, and a corresponding device according to embodiments may receive and parse a bitstream configured to be suitable for a selective partial data decoding structure, and partially decode point cloud data to efficiently provide the data (see FIG. 15).
Scalable Transmission According to Embodiments The point cloud data transmission method/device according to the embodiments may scalably transmit a bitstream containing point cloud data, and the point cloud data reception method/device according to the embodiments may scalably receive and decode the bitstream.

When a bitstream according to embodiments as illustrated in FIGS. 17 to 23 is used for scalable transmission, information for selecting a slice required by the receiver may be transmitted to the receiver. Scalable transmission may mean delivering or decoding only a part of the bitstream rather than decoding the entire bitstream, which may result in low resolution point cloud data.

When scalable transmission is applied to the octree-based geometry bitstream, point cloud data may need to be configured with information ranging only up to a specific octree layer for the bitstream of each octree layer (FIG. 16) from a root node to a leaf node.

To this end, the target octree layer should have no dependency on information about the lower octree layer. This may be a constraint applied to geometry coding and attribute coding in common.

In addition, in scalable transmission, it is necessary to deliver a scalable structure for selecting a scalable layer by the transmitter/receiver. Considering the octree structure according to the embodiments, all octree layers may support scalable transmission. Alternatively, scalable transmission may be allowed only for a specific octree layer and subsequent layers. When some of the octree layers are included, a scalable layer in which the slice is included may be indicated. Thereby, it may be determined whether the slice is necessary/unnecessary at the bitstream stage. In the example of FIG. 23-(*a*), one scalable layer may be configured without supporting scalable transmission in the yellow marked part starting from the root node, and the subsequent octree layers may be configured to match scalable layers in a one-to-one correspondence manner In general, scalability may be supported for a part corresponding to a leaf node. When multiple octree layers are included in a slice as shown in FIG. 23-(*c*), one scalable layer may be defined to be configured for the layers.

In this case, scalable transmission and scalable decoding may be used separately according to the purpose. The scalable transmission may be used at the transmitting/receiving side for the purpose of selecting information up to a specific layer without involving a decoder. The scalable decoding is used to select a specific layer during coding. That is, the scalable transmission may support selection of necessary information without involving a decoder in a compressed state (in the bitstream stage), such that the information may be transmitted or determined by the receiver. On the other hand, the scalable decoding may support encoding/decoding data only up to a required part in the encoding/decoding process, and may thus be used in such a case as scalable representation.

In this case, the layer configuration for scalable transmission may be different from the layer configuration for scalable decoding. For example, the three bottom octree layers including leaf nodes may constitute one layer in terms of scalable transmission. However, when all layer information is included in terms of scalable decoding, scalable decoding may be performed for each of leaf node layer n, leaf node layer n−1, leaf node layer n−2.

Hereinafter, a slice structure for the layer configuration described above and a signaling method for scalable transmission will be described.

Figure 24:
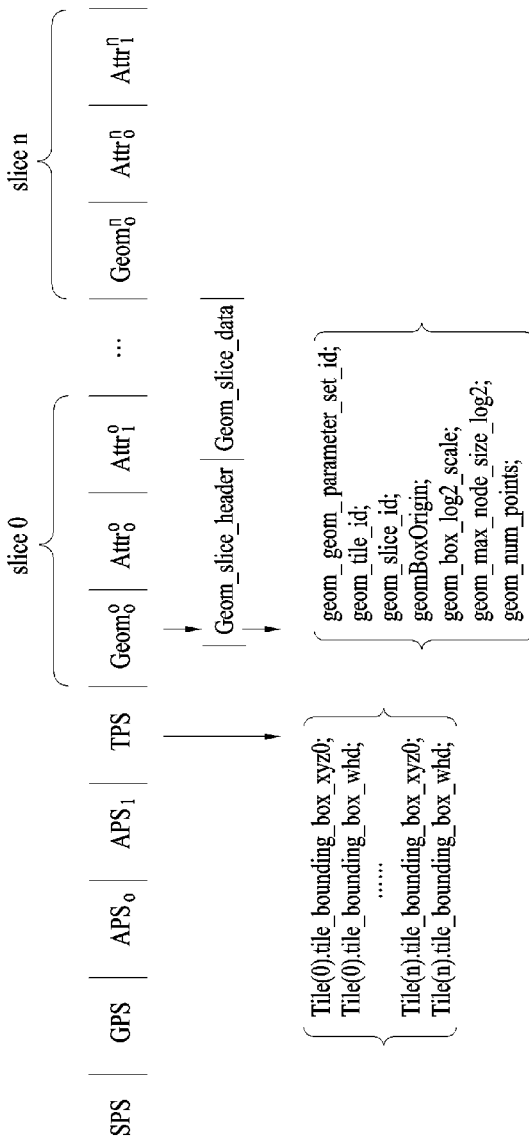
FIG. 24 illustrates a bitstream configuration according to embodiments.

FIG. 24 illustrates a bitstream configuration according to embodiments.

The method/device according to the embodiments may generate a bitstream as shown in FIG. 24. The bitstream may contain encoded geometry data and attribute data, and may contain parameter information.

Syntax and semantics for the parameter information are described below.

According to embodiments, information on a separated slice may be defined in a parameter set of the bitstream and an SEI message as follows.

The bitstream may include a sequence parameter set (SPS), a geometry parameter set (GPS), an attribute parameter set (APS), a geometry slice header, and an attribute slice header. In this regard, depending on the application or system, the range and method to be applied may be defined in a corresponding or separate position and used differently. That is, a signal may have different meanings depending on the position where the signal is transmitted. If the signal is defined in the SPS, it may be equally applied to the entire sequence. If the signal is defined in the GPS, this may indicate that the signal is used for position reconstruction. If the signal is defined in the APS, this may indicate that the signal is applied to attribute reconstruction. If the signal is defined in the TPS, this may indicate that the signal is applied only to points within a tile. If the signal is delivered in a slice, this may indicate that the signal is applied only to the slice. In addition, the range and method to be applied may be defined in a corresponding position or a separate position depending on the application or system so as to be used differently. In addition, when the syntax elements defined below are applicable to multiple point cloud data streams as well as the current point cloud data stream, they may be carried in a superordinate parameter set.

Abbreviations used herein are: SPS: Sequence Parameter Set; GPS: Geometry Parameter Set; APS: Attribute Parameter Set; TPS: Tile Parameter Set; Geom: Geometry bitstream=geometry slice header+geometry slice data; Attr: Attribute bitstream=attribute slice header+attribute slice data.

While the embodiments define the information independently of the coding technique, the information may be defined in connection with the coding technique. In order to support regionally different scalability, the information may be defined in the tile parameter set of the bitstream. In addition, when syntax elements defined below are applicable not only to the current point cloud data stream but also to multiple point cloud data streams, they may be carried in a superordinate parameter set or the like.

Alternatively, a network abstract layer (NAL) unit may be defined for a bitstream and relevant information for selecting a layer, such as layer_id, may be delivered. Thereby, a bitstream may be selected at a system level.

Hereinafter, parameters (which may be referred to as metadata, signaling information, or the like) according to the embodiments may be generated in the process of the transmitter according to the embodiments, and transmitted to the receiver according to the embodiments so as to be used in the reconstruction process.

For example, the parameters may be generated by a metadata processor (or metadata generator) of the transmission device according to the embodiments, which will be described later, and may be acquired by a metadata parser of the reception device according to the embodiments.

Hereinafter, syntax/semantics of parameters contained in the bitstream will be described with reference to FIGS. 25 to 28.

FIG. 25 shows syntax of a sequence parameter set and a geometry parameter set according to embodiments.

FIG. 26 shows syntax of an attribute parameter set according to embodiments.

FIG. 27 shows syntax of a geometry data unit header according to embodiments.

FIG. 28 shows syntax of an attribute data unit header according to embodiments.

Semantics of parameters according to embodiments included in FIGS. 25 to 28 are described below.

scalable_transmission_enable_flag: When equal to 1, it may indicate that a bitstream is configured to be suitable for scalable transmission. That is, as the bitstream is composed of multiple slices, information may be selected at the bitstream stage. Scalable layer configuration information may be transmitted to indicate that slice selection is available in the transmitter or receiver, and the geometry and/or attributes are compressed to enable partial decoding. When scalable_transmission_enable_flag is 1, a transcoder of the receiver or transmitter may be used to determine whether geometry and/or attribute scalable transmission is allowed. The transcoder may be coupled to or included in the transmission device and the reception device.

geom_scalable_transmission_enable_flag and attr_scalable_transmission_enable_flag: When equal to 1, they may indicate that the geometry or attribute is compressed to enable scalable transmission.

For example, for geometry, the flag may indicate that the geometry is composed of octree-based layers or that slice partitioning (see FIG. 23) is has been performed in consideration of scalable transmission.

When geom_scalable_transmission_enable_flag or attr_scalable_transmission_enable_flag is 1, the receiver may know that scalable transmission is available for the geometry or attributes.

For example, geom_scalable_transmission_enable_flag equal to 1 may indicate that octree-based geometry coding is used, and QTBT is disabled, or the geometry is coded in such a form as an octree by performing coding in order of BT-QT-OT.

attr_scalable_transmission_enable_flag to 1 may indicate that pred-Lifting coding is used by using scalable LOD generation or that scalable RAHT (e.g. Haar-based RAHT) is used.

num_scalable_layers may indicate the number of layers supporting scalable transmission. According to embodiments, a layer may mean an LOD.

scalable_layer_id specifies an indicator for a layer constituting scalable transmission. When a scalable layer is composed of multiple slices, common information may be carried in a parameter set by scalable_layer_id, and different information may be carried in a data unit header according to slices.

num_octree_layers_in_scalable_layer may indicate the number of octree layers included in or corresponding to a layer constituting scalable transmission. When the scalable layer is not configured based on the octree, it may refer to a corresponding layer.

tree_depth_start may indicate a starting octree depth (relatively closest to the root) among octree layers included in or corresponding to a layer constituting scalable transmission.

tree_depth_end may indicate the last octree depth (relatively closest to the leaf) among the octree layers included in or corresponding to a layer constituting scalable transmission.

node_size may indicate the node size of the output point cloud data when the scalable layer is reconstructed through scalable transmission. For example, when node_size equal to 1 may indicate the leaf node. Although the embodiments assume that the XYZ node size is constant, an arbitrary node size may be indicated by signaling the size in the XYZ directions or each direction in transformation coordinates such as (r (radius), phi, theta).

num_nodes may indicate the number of nodes included in the corresponding scalable layer.

num_slices_in_scalable_layer may indicate the number of slices belonging to the scalable layer.

slice_id specifies an indicator for distinguishing a slice or a data unit, and may deliver an indicator for a data unit belonging to the scalable layer.

aligned_slice_structure_enabled_flag: When equal to 1, it may indicate that the attribute scalable layer structure and/or slice configuration matches the geometry scalable layer structure and/or slice configuration. In this case, information on the attribute scalable layer structure and/or slice configuration may be identified through the information on the geometry scalable layer structure and/or slice configuration. That is, the geometry layer/slice structure is the same as the attribute layer/slice structure.

slice_id_offset may indicate an offset for obtaining an attribute slice or data unit based on the geometry slice id. According to embodiments, when aligned_slice_structure_enabled_flag is 1, that is, when the attribute slice structure matches the geometry slice structure, the attribute slice id may be obtained based on the geometry slice id as follows.

$$Slice\_id(attr)=slice\_id(geom)+slice\_id\_offset$$

In this case, the values provided in the geometry parameter set may be used for num_scalable_layers, scalable_layer_id tree_depth_start, tree_depth_end, node_size, num_nodes, and num_slices_in_scalable_layer, which are variables for configuring the attribute slice structure.

corresponding_geom_scalable_layer may indicate a geometry scalable layer corresponding to the attribute scalable layer structure.

num_tree_depth_in_data_unit may indicate a tree depth in which nodes belonging to a data unit are included.

tree_depth may indicate a tree depth.

num_nodes may indicate the number of nodes belonging to tree_depth among the nodes belonging to the data unit.

aligned_geom_data_unit_id may indicate a geometry data unit ID when the attribute data unit conforms to the scalable transmission layer structure/slice structure of the corresponding geometry data unit.

ref_slice_id may be used to refer to a slice that should precede the current slice for decoding (see, for example, FIGS. 18 to 20).

Figure 29:
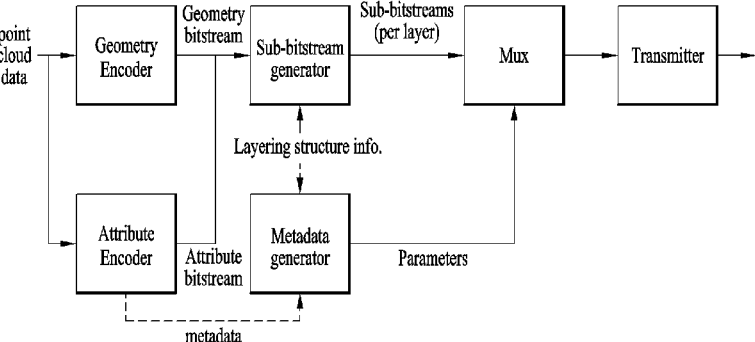
FIG. 29 illustrates a structure of a point cloud data transmission device according to embodiments.

FIG. 29 illustrates a structure of a point cloud data transmission device according to embodiments.

The transmission device according to the embodiments of FIG. 29 corresponds to the transmission device 10000 in FIG. 1, the point cloud video encoder 10002 in FIG. 1, the transmitter 10003 in FIG. 1, the acquisition 20000/encoding 20001/transmission 20002 in FIG. 2, the encoder in FIG. 4, the transmission device in FIG. 12, the device in FIG. 14, the encoder in FIG. 18, the transmission method in FIG. 30, and the like. Each component of FIG. 29 may correspond to hardware, software, a processor, and/or a combination thereof.

Operation of the Encoder or Transmitter According to the Embodiments:

When point cloud data is input to the transmission device, the encoder may encode position information (geometry data (e.g., XYZ coordinates, phi-theta coordinates, etc.)) and attribute information (attribute data (e.g., color, reflectance, intensity, grayscale, opacity, medium, material, glossiness, etc.)) (geometry encoding and attribute encoding).

The compressed (encoded) data is divided into units for transmission. The data may be divided by a sub-bitstream generator into units suitable for selection of necessary information in the bitstream unit according to layering structure information and may then be packed.

The layering structure information according to the embodiments is information indicating the bitstream configuration, arrangement, and selection, and slice configuration in FIGS. 16 to 23 and represents the information shown in FIGS. 24 to 28. The layering structure information may be generated by the metadata generator. The sub-bitstream generator may divide the bitstream, generate layering structure information indicating the division processing, and transmit the information to the metadata generator. The metadata generator may receive information indicating geometry encoding and attribute encoding from the encoder and generate metadata (parameters).

The transmission device according to the embodiments may multiplex and transmit the sub-bitstream and the parameters for each layer.

FIG. 30 illustrates a structure of a point cloud data reception device according to embodiments.

The reception device according to the embodiments of FIG. 30 corresponds to the reception device 10004 of FIG. 1, the receiver 10005 of FIG. 1, the point cloud video decoder 10006 of FIG. 1, the transmission 20002/decoding 20003/rendering 20004 of FIG. 2, the decoder of FIGS. 10 and 11, the reception device of FIG. 13, the device of FIG. 14, the decoder of FIG. 19, the reception method of FIG. 31, and the like. Each component of FIG. 30 may correspond to hardware, software, a processor, and/or a combination thereof.

Operation of the Decoder/Receiver According to the Embodiments:

When a bitstream is input to the reception device, the receiver may process the bitstream for position information and the for attribute information separately (Demultiplexing). In this case, the sub-bitstream classifier may transmit the sub-bitstreams to appropriate decoders based on the information in the bitstream header. Alternatively, in this process, a layer required by the receiver may be selected. Geometry data and attribute data may be reconstructed from the classified bitstreams by the geometry decoder and attribute decoder, respectively, according to the characteristics of the data, and may then be converted into a format for final output by the renderer.

The sub-bitstream classifier may classify/select a bitstream based on the metadata acquired by the metadata parser.

The geometry decoder and the attribute decoder may decode the geometry data and the attribute data, respectively, based on the metadata acquired by the metadata parser.

The operation of each component of the reception device of FIG. 30 may follow the operation of the corresponding component of the transmission device of FIG. 29, or a reverse process thereof.

FIG. 31 is a flowchart illustrating a point cloud data reception device according to embodiments.

FIG. 31 illustrates the operation of the sub-bitstream classifier shown in FIG. 30 in more detail.

The reception device receives data on a slice-by-slice basis, and the metadata parser delivers parameter set information such as the SPS, GPS, APS, and TPS. Based on the delivered information, scalability may be determined. When the data is scalable, the slice structure for scalable transmission is identified as shown in FIG. 31. First, the geometry slice structure may be identified based on information such as num_scalable_layers, scalable_layer_id, tree_depth_start, tree_depth_end, node_size, num_nodes, num_slices_in_scalable_layer, and slice_id carried in the GPS.

When aligned_slice_structure_enabled_flag is equal to 1, the attribute slice structure may also be identified in the same way (e.g., geometry is encoded based on an octree, attributes are encoded based on scalable LoD or scalable RAHT, and geometry/attribute slice pairs generated through the same slice partitioning have the same number of nodes for the same octree layer.

When the structures are identical, the range of geometry slice id is determined according to the target scalable layer, and the range of attribute slice id is determined by slice_id_offset. A geometry/attribute slice is selected according to the determined ranges.

When aligned_slice_sturcutre_enabled_flag=0, the attribute slice structure may be separately identified based on the information such as num_scalable_layers, scalable_layer_id tree_depth_start, tree_depth_end, node_size, num_nodes, num_slices_in_scalable_layer, and slice_id delivered through the APS, and the range of the necessary attribute slice id may be limited according to the scalable operation. Based on the range, a required slice may be selected through each slice id before reconstruction. The geometry/attribute slice selected through the above process is transmitted to the decoder as an input.

The decoding process according to the slice structure has been described above based on the scalable transmission or the scalable selection of the receiver. However, when scalable_transmission_enabled_flag is equal to 0, the operation of ranging geom/attr slice id may be skipped and the entire slices may be selected such that they may be used even in the non-scalable operation. Even in this case, information about a preceding slice (e.g., a slice belonging to a higher layer or a slice specified by ref slice_id) may be used through the slice structure information carried in a parameter set such as the SPS, GPS, APS, or TPS.

A bitstream may be received based on the scalable transmission, and the scalable bitstream structure may be identified based on the parameter information included in the bitstream.

A geometry scalable layer may be estimated.

A geometry slice may be identified based on geom_slice_id.

A geometry slice may be selected based on slice_id.

The decoder may decode the selected geometry slice.

When aligned_slice_structure_enabled_flag included in the bitstream is equal to 1, the attribute slice ID corresponding to the geometry slice may be checked. An attribute slice may be accessed based on slice_id_offset.

An attribute slice may be selected based on slice_id.

The decoder may decode the selected attribute slice.

When aligned_slice_structure_enabled_flag is not equal to 1, an attribute scalable layer may be estimated. An attribute slice may be identified based on the attribute slice ID.

An attribute slice may be selected based on slice_id.

The transmission device according to the embodiments has the following effects.

For point cloud data, the transmission device may divide and transmit compressed data according to a specific criterion. When layered coding according to the embodiments is used, the compressed data may be divided and transmitted according to layers. Accordingly, the storage and transmission efficiency on the transmitting side may be increased.

Referring to FIG. 15, the geometry and attributes of the point cloud data may be compressed and provided. In the PCC-based service, the compression rate or the amount of data may be adjusted according to the receiver performance or transmission environment.

In the case where point cloud data is configured in one slice, when the receiver performance or transmission environment changes, 1) a bitstream suitable for each environment may be transcoded and stored separately, and may be selected at the time of transmission, or 2) the transcoding may be needed prior to transmission. In this case, if the number of receiver environments to be supported increases or the transmission environment frequently changes, issues related to the storage space or a delay resulting from transcoding may be raised.

Figure 32:
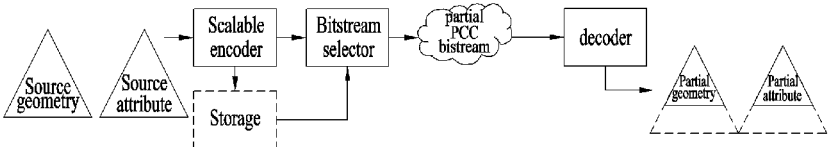
FIG. 32 illustrates transmission/reception of point cloud data according to embodiments.

FIG. 32 illustrates transmission/reception of point cloud data according to embodiments.

In order to address the above-described issues, the methods/devices according to the embodiments may process point cloud data as illustrated in FIG. 32.

When the compressed data is divided and transmitted according to layers according to the embodiments, only a necessary part of the pre-compressed data may be selectively transmitted in the bitstream stage without a separate transcoding process. The storage space may be efficiently operated as only one storage space is required per stream. In addition, efficient transmission may be implemented in terms of (bitstream selector) bandwidth because only necessary layers are selected before transmission.

The reception method/device according to the embodiments has may provide the following effects.

According to embodiments, compressed data may be divided and transmitted according to a single criterion for point cloud data. When layered coding is used, the compressed data may be divided and transmitted according to layers. In this case, the efficiency of the receiving side may be increased.

FIG. 15 illustrates the operations at the transmitting and receiving sides in the case of transmission of point cloud data composed of layers. In this case, when information for reconstructing the entire PCC data is delivered regardless of the receiver performance, the receiver needs to reconstruct the point cloud data through decoding and then select only data corresponding to a required layer (data selection or sub-sampling). In this case, since the transmitted bitstream is already decoded, a delay may occur in the receiver aiming at low latency or decoding may fail depending on the receiver performance.

Therefore, when a bitstream is divided into slices and delivered, the receiver may selectively deliver the bitstream to the decoder according to the density of point cloud data to be represented according to decoder performance or an application field. In this case, since selection is performed before decoding, decoder efficiency may be increased, and decoders of various performances may be supported.

The method/device according to the embodiments may deliver a bitstream using a layer group and a sub-group, and further perform slice segmentation.

FIG. 33 illustrates a single slice-based geometry tree structure and segmented slice-based geometry tree structure according to embodiments.

The method/device according to the embodiments may configure a slice for transmitting point cloud data as illustrated in FIG. 33.

FIG. 33 shows a geometry tree structure contained in different slice structures. According to G-PCC technology, the entire coded bitstream may be contained in a single slice. For multiple slices, each slice may contain a sub-bitstream. The order of the slices may be the same as the order of the sub-bitstreams. The bitstreams may be accumulated in breadth-first order of the geometry tree, and each slice may be matched to a group of tree layers (see FIG. 33-(b)). The segmented slices may inherit the layering structure of the G-PCC bitstream.

Slices may not affect previous slices, just as a higher layer does not affect lower layers in the geometry tree.

The segmented slices according to the embodiments are effective in terms of error robustness, effective transmission, support of region of interest, and the like.

1) Error Resilience

Compared to a single slice structure, a segmented slice may be more resilient to errors. When a slice contains the entire bitstream of a frame, data loss may affect the entire frame data. On the other hand, when the bitstream is segmented into multiple slices, some slices that are not affected by the loss even may be decoded even when some other slices are lost.

2) Scalable Transmission

Multiple decoders having different capabilities may be supported. When coded data is in a single slice, the LOD of the coded point cloud may be determined prior to encoding. Accordingly, multiple pre-encoded bitstreams having different resolutions of the point cloud data may be independently transmitted. This may be inefficient in terms of large bandwidth or storage space.

When a PCC bitstream is generated and included in segmented slices, the single bitstream may support decoders of different levels. From the decoder perspective, the receiver may select target layers and may deliver the partially selected bitstream to the decoder. Similarly, by using a single PCC bitstream without partitioning the entire bitstream, a partial PCC bitstream may be efficiently generated at the transmitter side.

3) Region Based Spatial Scalability

Regarding the G-PCC requirement, region based spatial scalability may be defined as follows. A compressed bitstream may be configured to have one or more layers. A particular region of interest may have a high density with additional layers, and the layers may be predicted from lower layers.

To support this requirement, it is necessary to support different detailed representations of a region. For example, in a VR/AR application, a distant object may be represented with low accuracy and a nearby object may be represented with high accuracy. Alternatively, the decoder may increase the resolution of the region of interest according to a request. This operation may be implemented using the scalable structure of G-PCC, such as the geometry octree and scalable attribute coding scheme. Decoders should access the entire bitstream based on the current slice structure including the entire geometry or attributes. This may lead to inefficiency in terms of bandwidth, memory, and decoder. On the other hand, when the bitstream is segmented into multiple slices, and each slice includes sub-bitstreams according to scalable layers, the decoder according to the embodiments may select slices as needed before efficiently parsing the bitstream.

Figure 34:
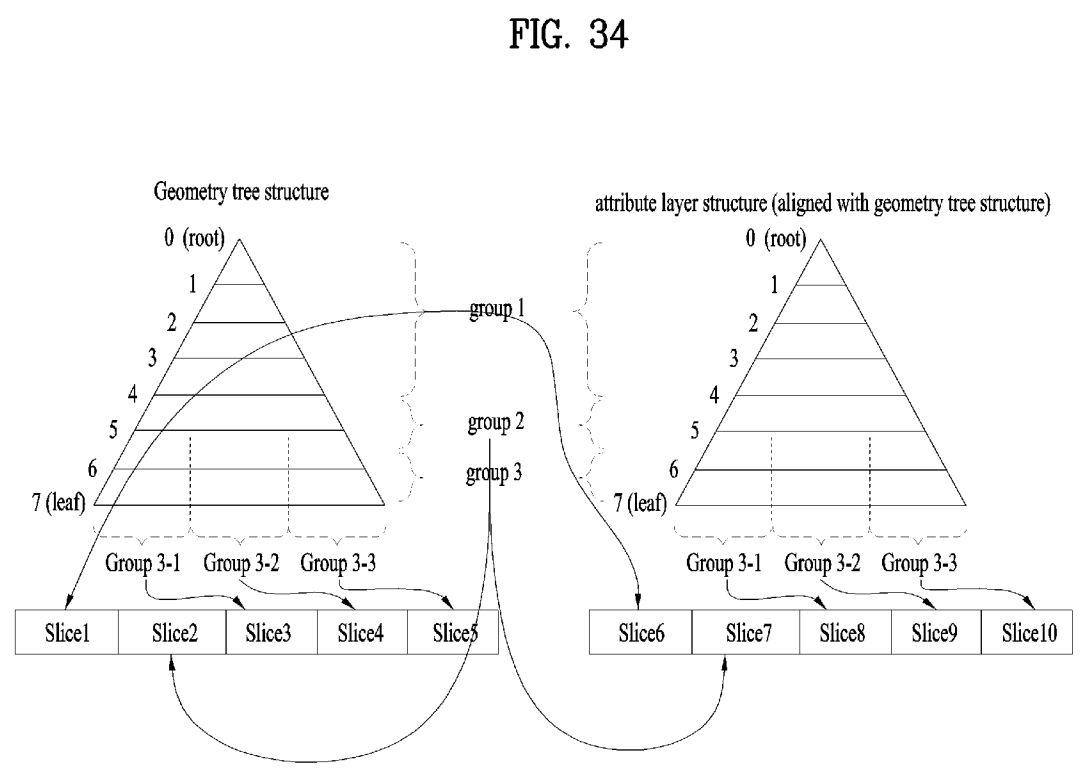

FIG. 34 illustrates a layer group structure of a geometry coding tree and an aligned layer group structure of an attribute coding tree according to embodiments.

The method/device according to the embodiments may generate a slice layer group using a hierarchical structure of point cloud data as shown in FIG. 34.

The method/device according to the embodiments may apply segmentation of geometry and attribute bitstreams contained in different slices. In addition, in terms of tree depth, a coding tree structure for geometry and attribute coding and each slice included in the partial tree information may be used.

FIG. 34-(a) shows an example of a geometry tree structure and a proposed slice segments.

For example, 8 layers may be configured in an octree, and 5 slices may be used to contain sub-bitstreams of one or more layers. A group represents a group of geometry tree layers. For example, group 1 includes layers 0 to 4, group 2 includes layer 5, and group 3 includes layers 6 and 7. Also, a group may be divided into three subgroups. Parent and child pairs are present in each subgroup. Groups 3-1 to 3-3 are subgroups of group 3. When scalable attribute coding is used, the tree structure is identical to the geometry tree structure. The same octree-slice mapping may be used to create attribute slice segments (FIG. 35-(b)).

A layer group represents a bundle of layer structure units generated in G-PCC coding, such as an octree layer and a LoD layer.

A sub-group may represent a set of neighboring nodes based on position information for one layer group. Alternatively, a set of neighbor nodes may be configured based on the lowest layer (which may be the layer closest to the root side, and may be layer 6 in the case of group 3 in FIG. 34) in the layer group, may be configured by Morton code order, may be configured based on distance, or may be configured according to coding order. Additionally, a rule may be defined such that nodes having a parent-child relationship are present in the same sub-group.

When a sub-group is defined, a boundary may be formed in the middle of a layer. Regarding whether continuity is maintained at the boundary, sps_entropy_continuation_enabled_flag, gsh_entropy_continuation_flag, and the like may be used to indicate whether entropy is used continuously, and ref_slice_id may be provided. Thereby, a continuation from the previous slice may be maintained.

Figure 35:
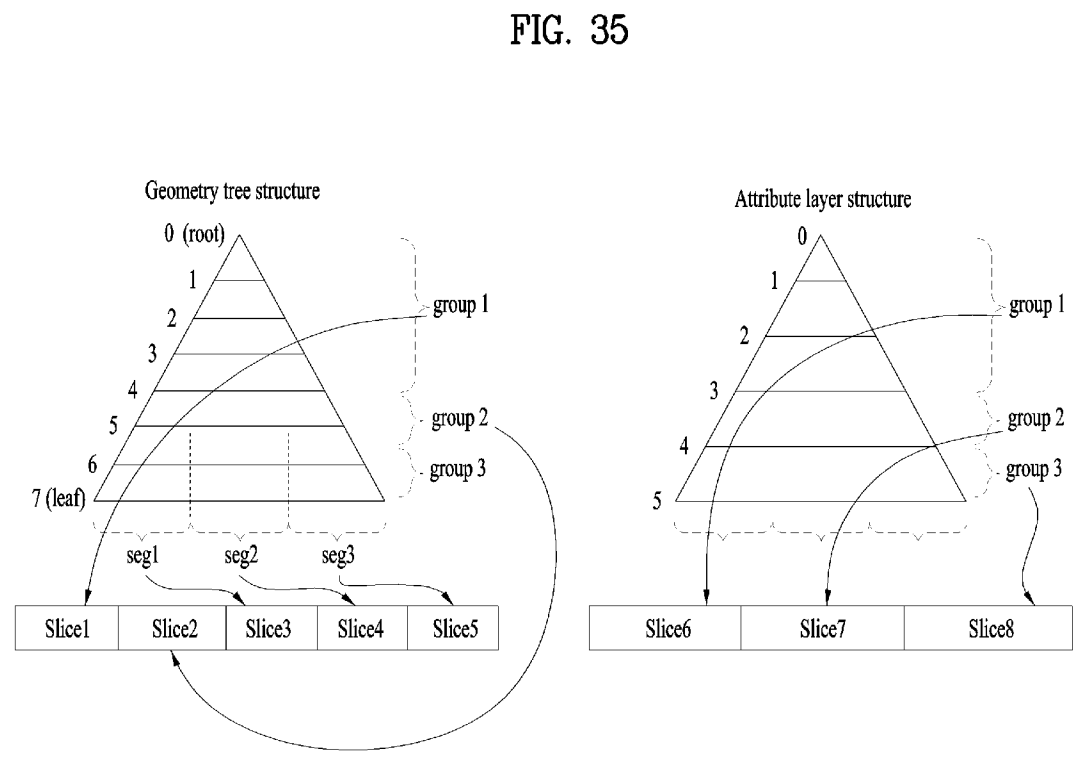

FIG. 35 illustrates a layer group structure of a geometry tree and an independent layer group structure of an attribute coding tree according to embodiments.

The method/device according to the embodiments may generate geometry-based slice layers and attribute-based slice layers as shown in FIG. 35.

The attribute coding layer may have a structure different from that of the geometry coding tree. Referring to FIG. 28-(b), groups may be defined independently of the geometry tree structure.

For efficient use of the layered structure of the G-PCC, segmentation of slices paired with the geometry and attribute layered structure may be provided.

For the geometry slice segments, each slice segment may contain coded data from a layer group. Here, the layer group is defined as a group of consecutive tree layers, the start and end depths of the tree layers may be a specific number in the tree depth, and the start depth is less than the end depth.

For the attribute slice segments, each slice segment may contain coded data from a layer group. Here, the layers may be tree depths or LODs according to an attribute coding scheme.

The order of the coded data in the slice segments may be the same as the order of the coded data in a single slice.

As parameter sets included in the bitstream, the following may be provided.

In the geometry parameter sets, a layer group structure corresponding to the geometry tree layers needs to be described by, for example, the number of groups, the group identifier, the number of tree depth(s) in the group, and the number of subgroup(s) in the group.

In the attribute parameter sets, indication information indicating whether the slice structure is aligned with the geometry slice structure is necessary. The number of groups, the group identifier, the number of tree depth(s), and the number of segment(s) are defined to describe the layer group structure.

The following elements are defined in the slice headers.

In the geometry slice header, a group identifier, a subgroup identifier, and the like may be defined to identify the group and subgroups of each slice.

In the attribute slice header, when the attribute layer structure is not aligned with the geometry group, it is necessary to identify the group and subgroups of each slice.

FIG. 36 shows syntax of parameter sets according to embodiments.

The syntax of FIG. 36 may be included together with parameter information of FIGS. 25 to 28 in the bitstream of FIG. 24.

num_layer_groups_minus1 plus 1 specifies the number of layer groups where the layer group represents a group of consecutive tree layers that are part of the geometry or attribute coding tree structure.

layer_group_id specifies the layer group identifier of the i-th layer group.

num_tree_depth_minus1 plus 1 specifies the number of tree depths contained in the i-th layer group.

num_subgroups_minus1 plus 1 specifies the number of subgroups in the i-th layer group.

aligned_layer_group_structure_flag equal to 1 specifies that the layer group and subgroup structure of the attribute slices is identical to the geometry layer group and subgroup structure. aligned_layer_group_structure_flag equal to 0 specifies that the layer group and subgroup structure of the attribute slices is not identical to the geometry layer group and subgroup structure.

geom_parameter_set_id specifies the geometry parameter set identifier that contains the layer group and subgroup structure information that is aligned with the attribute layer group structure.

FIG. 37 shows a geometry data unit header according to embodiments.

The header of FIG. 37 may be included together with parameter information of FIGS. 25 to 28 in the bitstream of FIG. 24.

subgroup_id specifies an indicator of a subgroup in a layer group indicated by layer_group_id. The range of subgroup_id may be 0 to num_subgroups_minus1.

layer_group_id and subgroup_id may be used to indicate the order of slices, and may be used to sort the slices in bitstream order.

Referring to FIG. 29, the transmission method/device and the encoder according to the embodiments may transmit the point cloud data by dividing the point cloud data into units for transmission. Through the bitstream generator, the data may be divided and packed into units (FIGS. 33 to 35) suitable for selecting necessary information in a bitstream unit according to the layering structure information.

Referring to FIG. 30, the reception method/device and decoder according to the embodiments may reconstruct geometry data and attribute data based on the bitstream layer (FIGS. 33 to 35).

In this case, the sub-bitstream classifier may deliver appropriate data to the decoder based on the information in the bitstream header. Alternatively, in this process, a layer required by the receiver may be selected.

Referring to FIG. 31, based on the slice layering bitstream of FIGS. 33 to 35, a geometry slice and/or an attribute slice may be selected with reference to necessary parameter information, and then decoded and rendered.

Based on the embodiments of FIGS. 33 to 37, compressed data may be divided and transmitted according to layers as shown in FIG. 32, and only a necessary part of the pre-compressed data may be selectively transmitted in the bitstream stage without a separate transcoding process. In this case, only one storage space is required per stream, and accordingly the storage space may be efficient operated. In addition, efficient transmission may be implemented in terms of (bitstream selector) bandwidth because only the necessary layers are selected before transmission.

In addition, the reception method/device according to the embodiments may receive the bitstream on a slice-by-slice basis, and the receiver may selectively transmit the bitstream to the decoder according to the density of point cloud data to be represented according to decoder performance or application field. In this case, since selection is made before decoding, decoder efficiency may be increased, and decoders of various performances may be supported.

Figure 38:
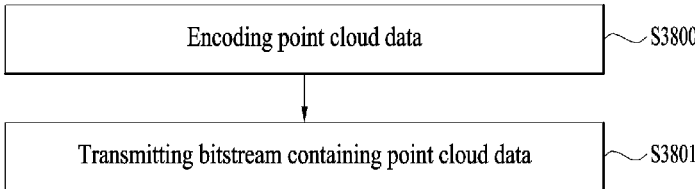
FIG. 38 illustrates a method of transmitting point cloud data according to embodiments.

FIG. 38 illustrates a method of transmitting point cloud data according to embodiments.

S3800: The point cloud data transmission method according to the embodiments may include encoding point cloud data.

The encoding according to the embodiments may include the transmission device 10000 and the point cloud video encoder 10002 in FIG. 1, the encoding 20001 in FIG. 2, the encoder in FIG. 4, the transmission device in FIG. 12, the XR device 1430 in FIG. 14, the encoder in FIG. 15, the LOD-based hierarchical data configuration in FIG. 16, the LOD (layer)-based geometry/attribute bitstream configuration in FIGS. 17 to 22, the slice-based bitstream configuration in FIG. 23, generation of a bitstream containing the parameters in FIG. 24, generation of the parameters in FIGS. 25 to 28, the geometry/attribute encoder and sub-bitstream generator, the metadata generator, and the mux in FIG. 29, the geometry/attribute encoding and bitstream selection in FIG. 32, the slice segmentation and slice grouping in FIGS. 33 to 35, and generation of the parameters in FIGS. 36 and 37.

S3801: The point cloud data transmission method according to the embodiments may further include transmitting a bitstream containing the point cloud data.

The transmission according to the embodiments may include the transmission device 10000 and the transmitter 10003 in FIG. 1, the transmission 20002 in FIG. 2, the transmission of the encoded bitstream in FIG. 12, data transmission by the XR device 1430 in FIG. 14, full or partial bitstream transmission according to the encoding in FIG. 15, transmission of the LOD (layer)-based geometry/attribute bitstream in FIGS. 17 to 22, transmission of the slice-based bitstream in FIG. 23, transmission of a bitstream containing the parameters in FIG. 24, transmission of the parameters in FIGS. 25 to 28, the transmitter in FIG. 29, the partial bitstream transmission in FIG. 32, the slice segmentation, slice grouping, and bitstream transmission in FIGS. 33 to 35, and transmission of the parameters in FIGS. 36 and 37.

Figure 39:
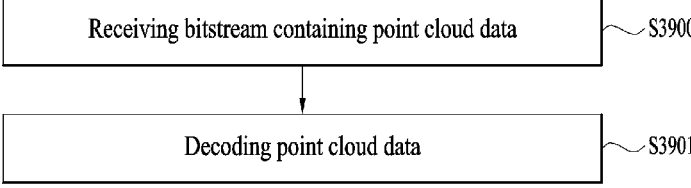
FIG. 39 illustrates a method of receiving point cloud data according to embodiments.

FIG. 39 illustrates a method of receiving point cloud data according to embodiments.

S3900: The point cloud data reception method according to the embodiments may include receiving a bitstream containing point cloud data.

The reception according to the embodiments may include the reception device 10004 and receiver 10005 in FIG. 1, the reception according to the transmission in FIG. 2, the reception of a bitstream in FIG. 13, the reception of data by the XR device 1430 in FIG. 14, the full or partial reception of the bitstream in FIG. 15, the reception of the LOD (layer)-based geometry/attribute bitstream in FIGS. 17 to 22, the reception of the slice-based bitstream in FIG. 23, the reception of the bitstream containing the parameters in FIG. 24, the reception of the parameters in FIGS. 25 to 28, the receiver in FIG. 30, the bitstream reception in FIG. 31, the partial bitstream reception in FIG. 32, the reception of a slice segmentation bitstream and the reception of a slice grouping bitstream in FIGS. 33 to 35, and the reception of the parameters in FIGS. 36 and 37.

S3901: The point cloud data reception method according to the embodiments may further include decoding the point cloud data.

The decoding according to the embodiments may include the receiver 10004 and point cloud video decoder 10006 in FIG. 1, the decoding 20003 in FIG. 2, the decoder in FIGS. 10 and 11, the reception device in FIG. 13, the XR device 1430 in FIG. 14, the full/partial bitstream decoding and the bitstream selection and decoding in FIG. 15, the full or partial bitstream decoding in FIG. 15, the decoding of the LOD (layer)-based geometry/attribute bitstream in FIGS. 17 to 22, the decoding of the slice-based bitstream in FIG. 23, the decoding of the bitstream containing the parameters in FIG. 24, the decoding of the parameters in FIGS. 25 to 28, the De-mux, sub-bitstream classifier, metadata parser, geometry/attribute decoder, and renderer in FIG. 30, the geometry/attribute slice selection in FIG. 31, the partial bitstream decoding in FIG. 32, the decoding of the slice segmentation bitstream and the decoding of the slice grouping bitstream in FIGS. 33 to 35, and the decoding of the parameters in FIGS. 36 and 37.

A transmission method (carried out by a transmission device) according to embodiments may include encoding point cloud data and transmitting a bitstream containing point cloud data.

The transmission method (device) according to the embodiments may generate the following bitstream to have a structure based on a discrimination unit such as a layer/LOD/slice.

Specifically, the bitstream may contain geometry data and attribute data of the point cloud data. The bitstream for the geometry data may contain levels of detail (LOD), wherein LOD 1 may contain geometry data contained in LOD 0 and additional geometry data, and the bitstream for the attribute data may include LODs, wherein LOD 1 may include attribute data contained in LOD 0 and additional attribute data (see the LOD-based bitstream configuration method in FIGS. 17 and 18).

The number of LODs may be, for example, 2. The bitstream may have more classification units depending on the degree of classification of the data details.

In addition, the bitstream for the geometry data in the bitstream may be positioned before the bitstream for the attribute data. Alternatively, the geometry data corresponding to LOD 0 and the attribute data corresponding to LOD 0 may be positioned before the geometry data corresponding to LOD 1 and the attribute data corresponding to LOD 1 in the bitstream (see the bitstream arrangement method in FIGS. 19 and 20).

In addition, the bitstream may contain geometry data corresponding to LOD 0, attribute data corresponding to LOD 0, geometry data corresponding to LOD 1, and attribute data corresponding to LOD 1. Geometry data and attribute data corresponding to LOD 2 may be excluded from the bitstream.

In addition, the bitstream may contain geometry data corresponding to LOD 0, attribute data corresponding to LOD 0, geometry data corresponding to LOD 1, attribute data corresponding to LOD 1, and geometry data corresponding to LOD 2. Attribute data corresponding to LOD 2 may be excluded from the bitstream (see the geometry-attribute symmetry/asymmetry in FIGS. 21 and 22).

In addition, the bitstream may contain point cloud data separately in LOD-based layers and slices containing point cloud data based on the layers (see the slice configuration in FIG. 23).

In addition, the bitstream may include a segmented slice containing partitioned data (see the segmented slice structure in FIG. 33).

In addition, the bitstream for the geometry data may contain a slice including a group including geometry data for one or more layers, and the bitstream for the attribute data may contain a slice including a group including attribute data for one or more layers.

In addition, a layer structure of the bitstream for the geometry data in the bitstream may be the same as or different from a layer structure of the bitstream for the attribute data (see the layer group slices in FIGS. 34 and 35).

A point cloud data reception device corresponding to the transmission device carrying out the transmission method according to the embodiments may be configured to carry out a reception method according to embodiments as follows.

The reception device may include a receiver configured to receive a bitstream containing point cloud data and a decoder configured to decode the point cloud data (see FIG. 1).

The bitstream processed by a bitstream classifier (see FIG. 30) for the decoder may contain geometry data and attribute data of the point cloud data. The bitstream for the geometry data may contain levels of detail (LODs), wherein LOD 1 may include geometry data included in LOD 0 and additional geometry data. The bitstream for the attribute data may include LODs, wherein LOD 1 may include attribute data included in LOD 0 and additional attribute data.

In addition, the bitstream for the geometry data in the bitstream may be positioned before the bitstream for the attribute data. Alternatively, the geometry data corresponding to LOD 0 and the attribute data corresponding to LOD 0 may be positioned before the geometry data corresponding to LOD 1 and the attribute data corresponding to LOD 1 in the bitstream.

Accordingly, compressed data may be divided and transmitted according to layers as shown in FIG. 32, and only a necessary part of the pre-compressed data may be selectively transmitted in the bitstream stage without a separate transcoding process. In this case, only one storage space is required per stream, and accordingly the storage space may be efficient operated. In addition, efficient transmission may be implemented in terms of (bitstream selector) bandwidth because only the necessary layers are selected before transmission.

Furthermore, the bitstream may be divided into slices so as to be transmitted/received, and the receiver may selectively decode the bitstream according to the density of point cloud data to be represented according to decoder performance or application field. In this case, since selection is made before decoding, decoder efficiency may be increased, and decoders of various performances may be supported.

Embodiments have been described from the method and/or device perspective, and descriptions of methods and devices may be applied so as to complement each other.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications may be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/ reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or a combination thereof. The firmware, software, and/ or a combination thereof may be stored in the processor or the memory.

The operations according to the above-described embodiments may be performed by the transmission device and/or the reception device according to the embodiments. The transmission/reception device includes a transmitter/receiver configured to transmit and receive media data, a memory configured to store instructions (program code, algorithms, flowcharts and/or data) for a process according to embodiments, and a processor configured to control operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

As described above, related contents have been described in the best mode for carrying out the embodiments.

As described above, the embodiments may be fully or partially applied to the point cloud data transmission/reception device and system.

It will be apparent to those skilled in the art that various changes or modifications may be made to the embodiments within the scope of the embodiments.

Thus, it is intended that the embodiments cover the modifications and variations of this disclosure provided they come within the scope of the appended claims and their equivalents.

What is claimed is:

1. A method comprising:
   encoding geometry data for a position of point cloud data based on a first partial slice in a bitstream,
   wherein the first partial slice is mapped to geometry of a subgroup in a layer group of a layer group structure; and
   encoding attribute data for an attribute of the point cloud data based on a second partial slice in the bitstream,
   wherein the second partial slice is mapped to attribute of the subgroup in the layer group of the layer group structure,
   transmitting the bitstream containing the point cloud data,
   wherein the bitstream further includes information for representing a number of layer groups, information for a number of tree depths in the layer group, information for identifying the layer group, and information for identifying the subgroup, wherein the layer group structure includes a plurality of layer groups related to the information for representing the number of layer groups,
   wherein each of the plurality of layer groups includes a plurality of tree depths related to the information for the number of tree depths in the layer group, and
   wherein the first partial slice and the second partial slice are identified by an identical pair of the information for identifying the layer group and the information for identifying the subgroup.

2. The method of claim 1, wherein the bitstream contains the geometry data and the attribute data of the point cloud data,
   wherein the bitstream for the geometry data contains LODs including LOD 0 and LOD 1,
   wherein the LOD 1 contains geometry data contained in the LOD 0 and additional geometry data,
   wherein the bitstream for the attribute data includes LODs, and LOD 1 includes attribute data included in LOD 0 and additional attribute data.

3. The method of claim 2, wherein the bitstream for the geometry data is positioned before the bitstream for the attribute data in the bitstream, or
   wherein geometry data corresponding to the LOD 0 and attribute data corresponding to the LOD 0 are positioned before geometry data corresponding to the LOD 1 and attribute data corresponding to the LOD 1 in the bitstream.

4. The method of claim 2, wherein the bitstream contains geometry data corresponding to the LOD 0, attribute data corresponding to the LOD 0, geometry data corresponding to the LOD 1, and attribute data corresponding to the LOD 1, with geometry data and attribute data corresponding to the LOD 2 being excluded from the bitstream, or
   wherein the bitstream contains the geometry data corresponding to the LOD 0, the attribute data corresponding to the LOD 0, the geometry data corresponding to the LOD 1, the attribute data corresponding to the LOD 1, and the geometry data corresponding to the LOD 2, with the attribute data corresponding to the LOD 2 being excluded from the bitstream.

5. The method of claim 1, wherein the bitstream contains the point cloud data classified into LOD-based layers, and contains a slice containing point cloud data based on the layers.

6. The method of claim 1, wherein the bitstream contains a segmented slice containing partitioned point cloud data.

7. The method of claim 6, wherein the bitstream for geometry data contains a slice containing a group including the geometry data for one or more layers,
   wherein the bitstream for attribute data contains a slice containing a group including the attribute data for the one or more layers,
   wherein a layer structure of the bitstream for the geometry data and a layer structure of the bitstream for the attribute data in the bitstream are the same or different from each other.

8. A device comprising:
   a memory; and
   at least one processor connected to the memory, the at least one processor configured to:
   encode geometry data for a position of point cloud data based on a first partial slice in a bitstream,
   wherein the first partial slice is mapped to geometry of a subgroup in a layer group of a layer group structure;
   encode attribute data for an attribute of the point cloud data based on a second partial slice in the bitstream, wherein the second partial slice is mapped to attribute of the subgroup in the layer group of the layer group structure; and transmit the bitstream containing the point cloud data, wherein the bitstream further includes information for representing a number of layer groups, information for a number of tree depths in the layer group, information for identifying the layer group, and information for identifying the subgroup, wherein the layer group structure includes a plurality of layer groups related to the information for representing the number of layer groups, wherein each of the plurality of layer groups includes a plurality of tree depths related to the information for the number of tree depths in the layer group, and wherein the first partial slice and the second partial slice are identified by an identical pair of the information for identifying the layer group and the information for identifying the subgroup.

9. The device of claim 8, wherein the bitstream contains the geometry data and the attribute data of the point cloud data by a bitstream generator for the encoder, wherein the bitstream for the geometry data contains LODs including LOD 0 and LOD 1, wherein the LOD 1 contains geometry data contained in the LOD 0 and additional geometry data, wherein the bitstream for the attribute data includes LODs, and LOD 1 includes attribute data included in LOD 0 and additional attribute data.

10. The device of claim 9, wherein the bitstream for the geometry data is positioned before the bitstream for the attribute data in the bitstream, or wherein geometry data corresponding to the LOD 0 and attribute data corresponding to the LOD 0 are positioned before geometry data corresponding to the LOD 1 and attribute data corresponding to the LOD 1 in the bitstream.

11. The device of claim 9, wherein the bitstream contains geometry data corresponding to the LOD 0, attribute data corresponding to the LOD 0, geometry data corresponding to the LOD 1, and attribute data corresponding to the LOD 1, with geometry data and attribute data corresponding to the LOD 2 being excluded from the bitstream, or wherein the bitstream contains the geometry data corresponding to the LOD 0, the attribute data corresponding to the LOD 0, the geometry data corresponding to the LOD 1, the attribute data corresponding to the LOD 1, and the geometry data corresponding to the LOD 2, with the attribute data corresponding to the LOD 2 being excluded from the bitstream.

12. The device of claim 8, wherein the bitstream contains, by a bitstream generator of the encoder, the point cloud data classified into LOD-based layers and contains a slice containing point cloud data based on the layers.

13. The device of claim 8, wherein the bitstream contains, by a bitstream generator of the encoder, a segmented slice containing partitioned point cloud data.

14. The device of claim 13, wherein the bitstream for geometry data contains a slice containing a group including the geometry data for one or more layers, wherein the bitstream for attribute data contains a slice containing a group including the attribute data for the one or more layers, wherein a layer structure of the bitstream for the geometry data and a layer structure of the bitstream for the attribute data in the bitstream are the same or different from each other.

15. A method comprising:

decoding geometry data for a position of point cloud data based on a first partial slice in a bitstream, wherein the first partial slice is mapped to geometry of a subgroup in a layer group of a layer group structure; and decoding attribute data for an attribute of the point cloud data based on a second partial slice in the bitstream, wherein the second partial slice is mapped to attribute of the subgroup in the layer group of the layer group structure, wherein the bitstream further includes information for representing a number of layer groups, information for a number of tree depths in the layer group, information for identifying the layer group, and information for identifying the subgroup, wherein the layer group structure includes a plurality of layer groups related to the information for representing the number of layer groups, wherein each of the plurality of layer groups includes a plurality of tree depths related to the information for the number of tree depths in the layer group, and wherein the first partial slice and the second partial slice are identified by an identical pair of the information for identifying the layer group and the information for identifying the subgroup.

16. The method of claim 15, wherein the bitstream contains the geometry data and the attribute data of the point cloud data, wherein the bitstream for the geometry data contains LODs including LOD 0 and LOD 1, wherein the LOD 1 contains geometry data contained in the LOD 0 and additional geometry data, wherein the bitstream for the attribute data includes LODs, and LOD 1 includes attribute data included in LOD 0 and additional attribute data.

17. The method of claim 16, wherein the bitstream for the geometry data is positioned before the bitstream for the attribute data in the bitstream, or wherein geometry data corresponding to the LOD 0 and attribute data corresponding to the LOD 0 are positioned before geometry data corresponding to the LOD 1 and attribute data corresponding to the LOD 1 in the bitstream.

18. A device comprising:

a memory; and at least one processor connected to the memory, the at least one processor configured to:

receive a bitstream containing point cloud data; and decoding geometry data for a position of point cloud data based on a first partial slice in a bitstream, wherein the first partial slice is mapped to geometry of a subgroup in a layer group of a layer group structure; and decode attribute data for an attribute of the point cloud data based on a second partial slice in the bitstream, wherein the second partial slice is mapped to attribute of the subgroup in the layer group of the layer group structure, wherein the bitstream further includes information for representing a number of layer groups, information for a number of tree depths in the layer group, information for identifying the layer group, and information for identifying the subgroup, wherein the layer group structure includes a plurality of layer groups related to the information for representing the number of layer groups, wherein each of the plurality of layer groups includes a plurality of tree depths related to the information for the number of tree depths in the layer group, and wherein the first partial slice and the second partial slice are identified by an identical pair of the information for identifying the layer group and the information for identifying the subgroup.

19. The device of claim 18, wherein the bitstream contains the geometry data and the attribute data of the point cloud data, the bitstream being processed by a bitstream classifier for the decoder, wherein the bitstream for the geometry data contains LODs including LOD 0 and LOD 1, wherein the LOD 1 contains geometry data contained in the LOD 0 and additional geometry data, wherein the bitstream for the attribute data includes LODs, and LOD 1 includes attribute data included in LOD 0 and additional attribute data.

* * * * *